US010873895B2

(12) United States Patent
Agiwal et al.

(10) Patent No.: US 10,873,895 B2
(45) Date of Patent: Dec. 22, 2020

(54) APPARATUS AND METHOD FOR PROVIDING RELAY SELECTION IN DEVICE-TO-DEVICE COMMUNICATION SYSTEM

(71) Applicant: Samsung Electronics Co., Ltd., Gyeonggi-do (KR)

(72) Inventors: Anil Agiwal, Bangalore (IN); Manali Sharma, Bangalore (IN); Nagacharan Udupi, Bangalore (IN); Anshuman Nigam, Bangalore (IN); Radhakrishnan Raju, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 200 days.

(21) Appl. No.: 15/537,854

(22) PCT Filed: Dec. 21, 2015

(86) PCT No.: PCT/KR2015/014038
§ 371 (c)(1),
(2) Date: Jun. 19, 2017

(87) PCT Pub. No.: WO2016/099227
PCT Pub. Date: Jun. 23, 2016

(65) Prior Publication Data
US 2017/0359766 A1 Dec. 14, 2017

(30) Foreign Application Priority Data

Dec. 19, 2014 (IN) .......................... 6381/CHE/2014
Dec. 15, 2015 (IN) .......................... 6381/CHE/2014

(51) Int. Cl.
*H04W 40/22* (2009.01)
*H04W 76/14* (2018.01)
(Continued)

(52) U.S. Cl.
CPC .......... *H04W 40/22* (2013.01); *H04L 5/0048* (2013.01); *H04L 5/0057* (2013.01); *H04L 27/26* (2013.01);
(Continued)

(58) Field of Classification Search
CPC ..... H04W 40/12; H04W 40/22; H04W 40/24; H04W 76/14; H04W 48/20; H04W 8/005;
(Continued)

(56) References Cited

U.S. PATENT DOCUMENTS

2010/0157845 A1* 6/2010 Womack .............. H04B 7/2606
370/254
2010/0167743 A1* 7/2010 Palanki .................. H04B 7/155
455/436
(Continued)

FOREIGN PATENT DOCUMENTS

| CN | 103442409 A | 12/2013 |
|---|---|---|
| CN | 103716853 A | 4/2014 |
| WO | 2013111104 A1 | 8/2013 |

OTHER PUBLICATIONS

3GPP TS 23.303 V12.3.0 (Dec. 2014) (Year: 2014).*
(Continued)

*Primary Examiner* — Habte Mered

(57) ABSTRACT

The present disclosure relates to a pre-$5^{th}$-generation (5G) or 5G communication system to be provided for supporting higher data rates beyond $4^{th}$-generation (4G) communication system such as a long term evolution (LTE). The various embodiments of the present disclosure disclose a method for selecting a relay in a source user equipment (UE) in a device-to-device (D2D) communication system. The method includes receiving a relay discovery message from one or more user equipment-network (UE-NW) relays; measuring a radio link quality of a wireless link between the source UE and a UE-NW relay for each of the one or more
(Continued)

UE-NW relays discovered by the source UE; and selecting a UE-NW relay using information included in the relay discovery message, the radio link quality of the wireless link between the source UE and the UE-NW relay and a radio link quality of the wireless link between the UE-NW relay and a base station (BS).

12 Claims, 13 Drawing Sheets

(51) Int. Cl.
| | |
|---|---|
| H04L 27/26 | (2006.01) |
| H04W 40/12 | (2009.01) |
| H04W 48/20 | (2009.01) |
| H04L 5/00 | (2006.01) |
| H04L 27/36 | (2006.01) |
| H04W 40/24 | (2009.01) |
| H04W 88/04 | (2009.01) |
| H04W 8/00 | (2009.01) |

(52) U.S. Cl.
CPC ........... *H04L 27/362* (2013.01); *H04W 40/12* (2013.01); *H04W 48/20* (2013.01); *H04W 76/14* (2018.02); *H04W 8/005* (2013.01); *H04W 40/24* (2013.01); *H04W 88/04* (2013.01); *Y02D 30/70* (2020.08)

(58) Field of Classification Search
CPC .... H04W 88/04; H04L 5/0048; H04L 5/0057; H04L 27/26; H04L 27/362; Y02D 70/1264; Y02D 70/26; Y02D 70/39; Y02D 70/21; Y02D 70/1262; Y02D 70/34; Y02D 70/1244; Y02D 70/1246
See application file for complete search history.

(56) References Cited

U.S. PATENT DOCUMENTS

| | | | |
|---|---|---|---|
| 2012/0129562 A1 | 5/2012 | Stamoulis et al. | |
| 2013/0235790 A1 | 9/2013 | Abraham et al. | |
| 2013/0235791 A1 | 9/2013 | Abraham et al. | |
| 2013/0322388 A1 | 12/2013 | Ahn et al. | |
| 2014/0016574 A1 | 1/2014 | Seo et al. | |
| 2014/0135019 A1 | 5/2014 | Jang et al. | |
| 2014/0171062 A1* | 6/2014 | Fallgren | H04W 40/22 455/422.1 |
| 2014/0219261 A1 | 8/2014 | Johnsson | |
| 2015/0029866 A1* | 1/2015 | Liao | H04W 4/023 370/241 |
| 2015/0358899 A1* | 12/2015 | Ko | H04W 72/042 370/252 |
| 2016/0037568 A1* | 2/2016 | Hakola | H04W 76/14 370/329 |
| 2017/0325243 A1* | 11/2017 | Yasukawa | H04W 48/08 |

OTHER PUBLICATIONS

Extended European Search Report for European Application No. 15870394.2, dated Nov. 27, 2017. (13 pages).
3GPP TS 23.303 V12.0.0; 3rd Generation Partnership Project; Technical Specification Group Services and System Aspects; Proximity-based services (ProSe); Stage 2 (Release 12); Feb. 2014. (53 pages).
Orange, "Corrections to consolidated Annexes for TS 23.303", SA WG2 Meeting #101bis; S2-140696; San Jose Del Cabo, Mexico, Feb. 17-21, 2014. (23 pages).
China National Intellectual Property Administration, "The First Office Action," Application No. CN201580069543.1, dated Aug. 28, 2019, 67 pages.
3GPP TS 24.334 V13.2.0 (Dec. 2015), Technical Specification, 3rd Generation Partnership Project; Technical Specification Group Core Network and Terminals; Proximity-services (ProSe) User Equipment (UE) to ProSe function protocol aspects; Stage 3 (Release 13), 3 pages.
LG Electronics, "Relay selection and reselection," R2-156492, 3GPP TSG-RAN WG2 #92, Anaheim, US, Nov. 15-20, 2015, 7 pages.
Qualcomm (Rapporteur), "Report of email discussion [91#31][LTE/D2D] Relay selection and reselection," R2-154796, 3GPP TSG-RAN WG2 Meeting #91bis, Malmo, Sweden, Oct. 5-9, 2015, 22 pages.
Sony, "Considerations on ProSe Relays Selection," S2-143134, SA WG2 Meeting #105, Sapporo, Japan, Oct. 13-17, 2014, 8 pages.

\* cited by examiner

APPARATUS AND METHOD FOR PROVIDING RELAY SELECTION IN DEVICE-TO-DEVICE COMMUNICATION SYSTEM

CROSS-REFERENCE TO RELATED APPLICATIONS AND CLAIM OF PRIORITY

The present application claims priority under 35 U.S.C. § 365 to International Patent Application No. PCT/KR2015/014038 filed on Dec. 21, 2015, entitled "APPARATUS AND METHOD FOR PROVIDING RELAY SELECTION IN DEVICE-TO-DEVICE COMMUNICATION SYSTEM", to Indian Patent Application No. 6381/CHE/2014 filed on Dec. 19, 2014, and to Indian Patent Application No. 6381/CHE/2014 filed on Dec. 15, 2015, each of which are incorporated herein by reference into the present disclosure as if fully set forth herein.

TECHNICAL FIELD

The present disclosure generally relates to wireless communication. More particularly, embodiments of the present disclosure relates to user equipment-user equipment (UE-UE) relay selection and user equipment-network (UE-NW) relay selection in a device-to-device (D2D) communication system.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'Beyond 4G Network' or a 'Post long-term evolution (LTE) System'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional multiple-input multiple-output (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM), and a sliding window superposition coding (SWSC) as an advanced coding modulation (ACM) scheme, and a filter bank multi carrier (FBMC) scheme, a non-orthogonal multiple access (NOMA) scheme, and a sparse code multiple access (SCMA) scheme as an advanced access technology have been developed.

D2D communication is being studied in communication standard groups to enable data communication services between the UEs. During the D2D communication, a transmitting D2D UE can transmit control and/or data packets to a group of D2D UEs or broadcast control and/or data packets to all the D2D UEs or send unicast control and/or data packets to a specific D2D UE. During the transmission, the transmitting D2D UE includes a source identifier (ID) and a destination ID in the packets. The source ID is set to the UE ID of the transmitting D2D UE. The destination ID is the identity of the intended recipient (e.g. D2D UE or group of D2D UEs or all D2D UEs) of the transmitted packet.

One of the requirements of D2D communication is that the two UEs should be able to communicate even when they are not in D2D communication range. In order to fulfill this requirement UE to UE relay is being studied wherein a D2D UE can act as relay to enable communication between two UEs.

FIG. 1a is a schematic diagram 100 illustrating D2D communication based on UE to UE relay. According to the diagram 100, UE1 wants to communicate with UE2. UE1 searches for UE2 but does not find UE2 in its communication range. So UE1 searches for another UE3 (referred as UE-UE Relay) which is in its proximity and also in proximity of UE2. UE1 sends control and/or data packets destined for UE2 to UE3. UE3 sends the received control and/or data packets from UE1 to UE2. UE2 sends control and/or data packets destined for UE1 to UE3. UE3 sends the received control and/or data packets from UE2 to UE1.

Another requirement of D2D communication is that a UE 1 should be able to communicate with network via another UE UE2 (i.e. referred as UE-to-Network Relay) which is in coverage of network and is in proximity of UE. UE1 may be in coverage of network or out of coverage of network. This is illustrated in FIG. 1b.

One of the issues in D2D communication based on UE-UE relay or UE-NW relay is that during the searching of UE-UE relay or UE-NW relay, the UE may find multiple UE-UE relays or UE-NW relays and UE has to select one of them for relay operation.

The above mentioned shortcomings, disadvantages and problems are addressed herein and which will be understood by reading and studying the following specification.

SUMMARY

In view of the foregoing, there is a need for a method for UE-UE relay selection and UE-NW relay selection in a D2D communication system.

The various embodiments of the present disclosure disclose a method of performing UE-UE relay selection and UE-NW relay selection in a D2D communication system. According to an embodiment herein, the method of selecting a relay for a device-to-device (D2D) communication system comprises of receiving, by a source user equipment (UE), a relay discovery message from one or more user equipment-network (UE-NW) relay, determining, by the source UE, a radio link quality of at least one of a wireless link between the source UE and UE-NW relay and a wireless link between the UE-NW relay and a base station (BS) and selecting, by the source UE, a UE-NW relay using at least one of information received in the relay discovery message, radio link quality of wireless link between the source UE and UE-NW relay and radio link quality of wireless link between the UE-NW relay and the BS.

According to an embodiment of the present disclosure, the relay discovery message comprises at least one of a relay UE identifier (ID), user info identifier, a relay service code, relay discovery message type, radio link quality of the wireless link between the UE-NW relay and the BS.

According to an embodiment of the present disclosure, the relay discovery message is at least one of relay discovery announcement message and a relay discovery response message. Here the relay discovery announcement message is periodically transmitted by the UE-NW relay. Further the relay discovery response message is transmitted by UE-NW relay in response to a relay discovery solicitation message transmitted by the source UE.

According to an embodiment of the present disclosure, the method of determining, by the radio link quality of the wireless link between the source UE and UE-NW relay by the source UE comprises of receiving, by the source UE, a demodulation reference signal (DM RS) from the UE-NW relay in physical resource blocks of a D2D discovery channel in which relay discovery message is received from the UE-NW relay and measuring the demodulation-reference signal received power (D-RSRP). The D-RSRP is a linear average over the received power contributions of one or more resource elements that carry DMRS associated with the D2D discovery channel. The power per resource element is determined from energy received during a useful part of an orthogonal frequency division multiplexing (OFDM) symbol, excluding a cyclic prefix (CP).

According to an embodiment herein, the method of determining, the radio link quality of the wireless link between the UE-NW relay and the BS by the source UE further comprises of receiving, by the source UE, the radio link quality of wireless link between the UE-NW relay and BS in the relay discovery message from the UE-NW relay.

According to an embodiment herein, selecting a UE-NW by the source UE comprises of creating, a list of candidate UE-NW relays wherein a UE-NW relay is a candidate if the relay service code received in the relay discovery message is the same as the relay service code for the connectivity service in which the source UE is interested and/or the user Info ID received in the relay discovery message is the same as the user info ID of UE-NW relay provisioned in source UE for connectivity service in which the source UE is interested and selecting, a relay from created list of candidate relays using at least one of a radio link quality of the wireless link between the source UE and UE-NW relay and radio link quality of wireless link between the UE-NW relay and the BS if there is more than one candidate relay.

According to an embodiment herein, the method of selecting, a relay from created list of candidate relays comprises of selecting the relay with a highest value of radio link quality measurement metric of wireless link between the source UE and UE-NW relay amongst those relays for which radio link quality of wireless link between the source UE and UE-NW relay is above a threshold by MinHsyterisis.

According to an embodiment herein, the relay service code corresponding to the connectivity service in which the Source UE is interested is provided by the network or pre-defined in the source UE. The user Info ID of the UE-NW relay corresponding to connectivity service in which the Source UE is interested is provided by the network or pre-defined in the source UE.

Embodiments herein further disclose a device-to-device (D2D) communication system, comprising a source User Equipment (UE) in communication with network over a user equipment-network (UE-NW) relay. The source UE is adapted for receiving a relay discovery message from one or more user equipment-network (UE-NW) relay, determining a radio link quality of at least one of a wireless link between the source UE and UE-NW relay and a wireless link between the UE-NW relay and a base station (BS) a selecting a UE-NW relay using at least one of information received in the relay discovery message, radio link quality of wireless link between the source UE and UE-NW relay and radio link quality of wireless link between the UE-NW relay and the BS.

The foregoing has outlined, in general, the various aspects of the disclosure and is to serve as an aid to better understand the more complete detailed description which is to follow. In reference to such, there is to be a clear understanding that the present disclosure is not limited to the method or application of use described and illustrated herein. It is intended that any other advantages and objects of the present disclosure that become apparent or obvious from the detailed description or illustrations contained herein are within the scope of the present disclosure.

BRIEF DESCRIPTION OF THE DRAWINGS

The other objects, features and advantages will occur to those skilled in the art from the following description of the preferred embodiment and the accompanying drawings in which.

Figure 1A:
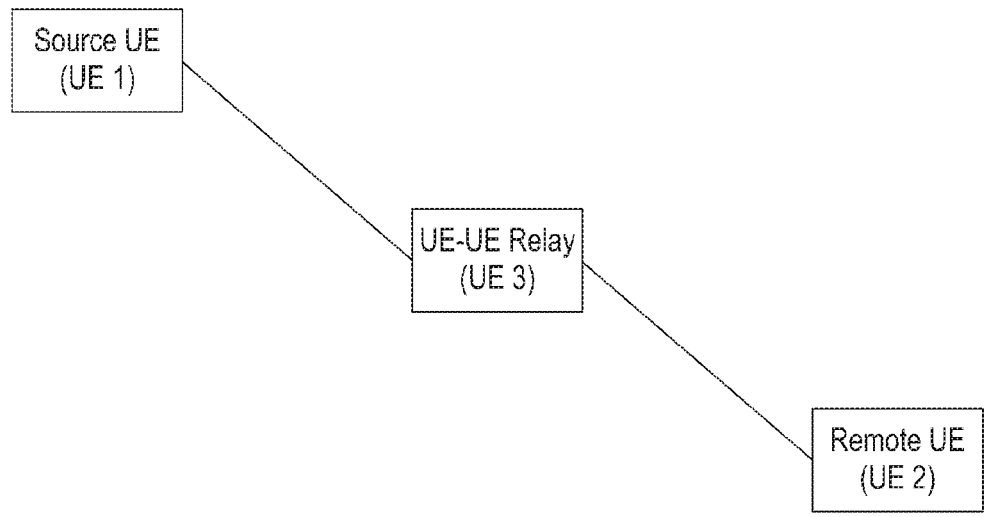
FIG. 1a is a schematic diagram illustrating D2D communication based on UE to UE relay.
Figure 1B:
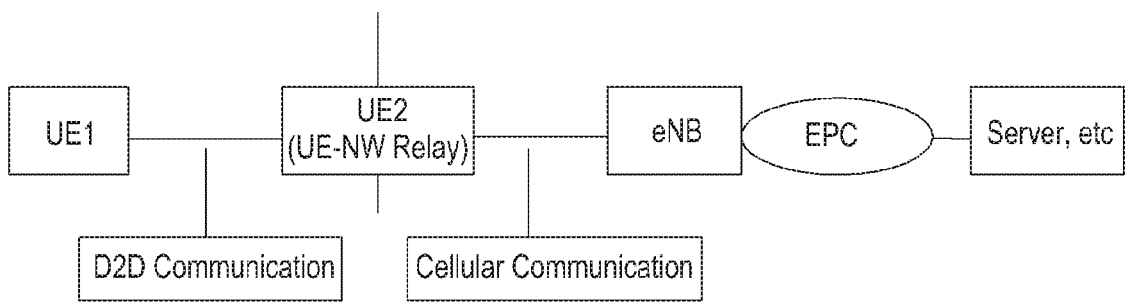
FIG. 1b is a schematic diagram illustrating D2D communication based on UE to NW relay.

Although specific features of the present disclosure are shown in some drawings and not in others, this is done for convenience only as each feature may be combined with any or all of the other features in accordance with the present disclosure.

DETAILED DESCRIPTION

The various embodiments of the present disclosure disclose a method of performing user equipment-user equipment (UE-UE) relay selection and user equipment-network (UE-NW) relay selection in a device-to-device (D2D) communication system. In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following detailed description is, therefore, not to be taken in a limiting sense, and the scope of the present disclosure is defined only by the appended claims.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features, integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure discloses methods for UE-UE relay selection and UE-NW relay selection in a D2D communication system. Various embodiments are described in the present disclosure to describe the working of the methods, without limiting the scope of the present disclosure. Various examples are used herein intended to facilitate an understanding of ways in which the embodiments herein can be practiced and to further enable those of skill in the art to practice the embodiments herein. Accordingly, the examples should not be construed as limiting the scope of the embodiments herein.

A method and apparatus proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a 3rd generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system and/or the like.

According to the embodiments herein, the UE, UE-UE relay, UE-NW relay can be one of a Mobile device, smart device such as smartphones, phablets and tablets, wearable devices such as smartwatches, smart bands, smart key chains and the like.

Figure 2:
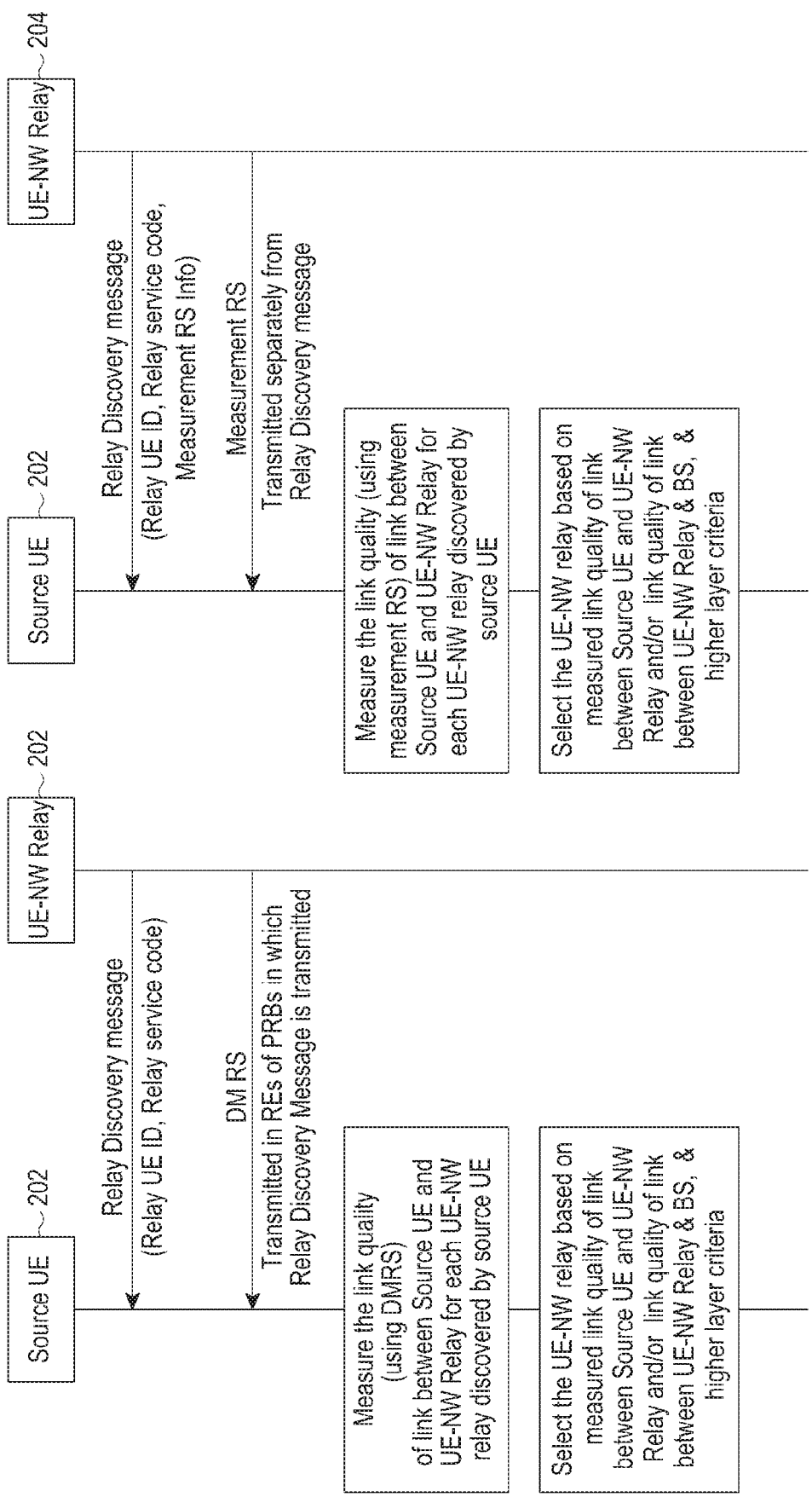
FIG. 2 is a schematic flow diagram illustrating signaling flow for UE-NW relay selection, according to an embodiment of the present disclosure.

FIG. 2 is a schematic flow diagram illustrating signaling flow for UE-NW relay selection, according to an embodiment of the present disclosure. The UE-NW relay 204 is in coverage of a network (not shown). The UE-NW relay 204 is a UE having the capability to act as relay for relaying the Source UE's 202 traffic to network and vice versa. In order to enable a source UE 202 to discover the UE-NW relay 204 in its proximity, the UE-NW relay 204 periodically transmits a relay discovery announcement message. The relay discovery announcement message is transmitted over a Physical D2D Discovery Channel. It is to be noted that discovery messages for other purposes may be transmitted on the Physical D2D Discovery Channel. In an embodiment, the relay discovery announcement message is distinguished from other discovery messages by a type field in the discovery message. The relay discovery announcement message comprises of a Relay UE identifier (ID), user info ID, a relay service code, where the relay UE ID is a layer 2 identifier of UE-NW relay, user info ID is an application layer user ID and the Relay service code identifies the connectivity service (e.g. access point name (APN)) provided by the UE-NW relay 204. The relay service code corresponding to connectivity service may be provisioned in the UE-NW relay by network or may be predefined. UE-NW relay may support multiple connectivity service and UE-NW relay may have distinct Relay UE ID and relay service code for distinct connectivity service. The relay service code may also identify authorized users to which the UE-NW Relay 204 offers service. For e.g. a relay service code for relays for police members is different than a relay service code for relays for fire fighters, even though potentially they provided connectivity to same APN e.g. to support Internet access. In an alternate embodiment relay discovery announcement message comprises of a Relay UE ID, connectivity info (i.e. APN) and list of IDs of one or more groups for which the UE-NW relay provides the relaying service. It is to be noted relay discovery announcement message may comprise of other parameters (e.g. security parameters) in addition to those defined in this disclosure.

In another embodiment instead of UE-NW relay 204 periodically transmitting relay discovery announcement message, the Source UE 202 transmits relay discovery solicitation message. The relay discovery solicitation message comprises of relay service code. The relay service code indicates the information about the connectivity source UE 202 is interested in. The relay service code corresponding to connectivity service may be provisioned in the source UE 202 by network or may be predefined. UE-NW relay 204 which receives the relay discovery solicitation message and matches the interest criteria of Source UE 202 transmits a relay discovery response message. The relay discovery response message comprises of Relay UE ID, user Info ID, relay service code. The relay discovery solicitation message and relay discovery response message are transmitted over Physical D2D discovery channel. It is to be noted that discovery messages for other purposes may be transmitted on the Physical D2D Discovery Channel. In an embodiment, the relay discovery solicitation message, relay discovery response message are distinguished from other discovery messages by a type field in the discovery message. It is to be noted relay discovery response and solicitation message may comprise of other parameters (e.g. security parameters) in addition to those defined in this disclosure.

In addition to transmitting the relay discovery announcement message or relay discovery response message, the UE-NW relay 204 also transmits a reference signal for radio link/channel (i.e. wireless link/channel between source UE 202 and UE-NW relay 204) quality measurement. The reference signal is transmitted with every relay discovery announcement message or relay discovery response message. In one embodiment, the reference signal is transmitted based on a request from the source UE 202. In one embodiment after discovering the relay, in order to receive the reference signal for radio link/channel quality measurement, source UE 202 may send a relay discovery solicitation message or another discovery message and in response UE-NW relay 204 transmit relay discovery response message or another discovery message together with the reference signal. The source UE 202 may send a relay discovery solicitation message or another discovery message periodically.

The reference signal can be a synchronization signal (SS) or any other reference signal (RS) (e.g. D2D SS or Sounding RS or new RS or demodulation (DM) RS etc.). The source UE 202 may identify the reference signal specific to UE-NW relay 204 based on sequence identifier and/or time/frequency resource information related to reference signal. The information (sequence identifier and/or time/frequency resource information) related to reference signal is transmitted in relay discovery announcement message or relay discovery response message. In one embodiment the information (sequence identifier and/or time/frequency resource information) related to reference signal may be transmitted in separate message (other than relay discovery announcement or response message). Alternately, source UE 202 may identify the information related to reference signal using the relay UE ID. The UE-NW relay 204 determines the reference signal related information as follows:

In one embodiment, the UE-NW Relay 204 monitors radio channel for a specific time period to detect the measurement reference signal transmitted by other UEs in its vicinity. The UE-NW Relay 204 selects a sequence from a set of sequences (pre-defined or configured by network) excluding the detected sequences. The UE-NW Relay 204 transmits the sequence in a measurement reference signal. The time/frequency resource information is fixed/configured by network and known to all UEs. The selected sequence is used as long as it wants or for a specific time period configured by network in broadcast or dedicated signaling or for the time duration it is performing D2D communication.

In another embodiment, the UE-NW Relay 204 randomly selects the sequence and/or time resource and/or frequency resources for transmitting measurement reference signal. The selected sequence and/or time/frequency resource is used as long as it wants or for a specific time period configured by network in broadcast or dedicated signaling or for the time duration it is performing D2D communication.

In another embodiment, the UE-NW Relay 204 requests the measurement reference signal information from the network (e.g. base station (BS)). The network in turn assigns a unique sequence and/or time/frequency resource for transmission. The UE-NW relay 204 uses the selected sequence as long as it wants or for a specific time period configured by network in broadcast or dedicated signaling or for the time duration the UE-NW relay 204 is performing D2D communication or until the time the UE-NW relay 204 is in connected state.

In another embodiment, a base sequence is fixed/configured by network to UEs. The UE-NW Relay 204 derives the sequence for transmitting measurement reference signal using its Relay UE ID. The UE-NW Relay 204 may also derive the time/frequency resource from a set of resources for transmitting measurement reference signal using its Relay UE ID.

In another embodiment, UE-NW relay 204 transmits the relay discovery announcement or relay discovery response message at regular intervals so that relay discovery announcement message or relay discovery response message itself can be used for measurement of link/channel quality between Source UE 202 and UE-NW Relay 204. A demodulation reference signal (DMRS) is transmitted in physical resource blocks in which relay discovery announcement message or relay discovery response message is transmitted and used by Source UE 202 to measure the link/channel quality of link between Source UE 202 and UE-NW Relay 204. For relay discovery announcement or relay discovery response message or relay discovery solicitation messages, a separate transmission and reception discovery resource pool with shorter discovery period can be configured. Separate discovery resources avoid collisions between discovery messages related to relay operation and discovery messages for other purposes (e.g. member discovery, friend discovery etc). Separate discovery resources for relay operation also reduces the measurement effort at source UE 202 as source UE 202 has to perform measurement only in discovery resources related to relay. Separate discovery resources also facilitate configuring shorter discovery period for discovery messages related to relay operation. Source UE 202 and UE-NW Relay 204 transmits and receives the discovery messages related to relay operation in transmission and reception resource pool designated for relay discovery. Alternately, relay discovery announcement or relay discovery response message or relay discovery solicitation message can be transmitted & received using discovery resources in transmission and reception public safety discovery resource pool(s). In idle state, Source UE 202 and UE-NW Relay 204 use the public safety discovery resource pool(s) broadcasted by network. If public safety discovery resource pool(s) are not broadcasted by network Source UE 202 and UE-NW Relay 204 may enter connected state to request PS discovery resources. Public safety discovery resource pool(s) are used by discovery operation by public safety UEs. Shorter discovery period can be configured in public safety discovery resource pool(s). In one embodiment, network may indicate whether the public safety discovery resources can be used for relay related discovery messages or not.

In one embodiment, the UE-NW relay 204 measures the link quality (RSRP or RSRQ or received signal strength indicator (RSSI) or channel quality information (CQI)) of link (Relay UE-BS link) between itself and the network (i.e. BS or eNB) using downlink (DL) signal received from the base station. This link quality information is transmitted in relay discovery announcement message or relay discovery response message or in a separate message. The relay to network link quality information may be transmitted if it is greater than a threshold. The relay to network link quality information may be transmitted if requested by the source UE 202 or may be transmitted periodically. The UE-NW relay 204 may also include power budget in addition to link quality. For example the power budget can be represented in quantized percentage level of the available battery power e.g. 100%, 75%, 50%, 25% etc.

The Source UE 202 measures the link/channel quality (CQI or RSSI or RSRP or RSRQ) of the source UE-Relay link using measurement reference signal (as explained earlier) transmitted by the UE-NW relay 204. This is performed for each UE-NW relay 204 discovered (i.e. from which the source UE 202 is able to receive Relay discovery announcement message or relay discovery response message) by source UE 202. The Source UE 202 determines the measurement RS transmitted by the UE-NW relay 204 based on measurement RS information received in the discovery message/other message or using the relay UE ID. Alternately, the source UE 202 measures the link quality using relay discovery message or relay discovery response message transmitted by UE-NW relay 204. For the measurement of link between source UE 202 and UE-NW relay 204 using the relay discovery messages, the Source UE 202 measures the discovery reference signal received power (D-RSRP). The D-RSRP is defined as the linear average over the power contributions of the resource elements that carry demodulation reference signals (DMRS) associated with physical D2D discovery channel. The power per resource element is determined from the energy received during the useful part of the OFDM symbol, excluding a cyclic prefix (CP). The CP is not used as it is affected by signals from other UEs. The Source UE 202 performs multiple measurements over a defined period and averages the measurements performed over the defined period.

The source UE 202 selects a UE-NW relay which fulfills first criteria and second criteria. According to first criteria source UE 202 checks whether UE-NW relay supports desired connectivity service or is of its interest (e.g. supports desired QoS, battery level or UE belongs to his group or friend) based on information received in relay discovery announcement message or relay discovery response message. According to second criteria source UE 202 checks the link quality of link (Source UE-Relay link) between source UE and UE-NW relay and/or link quality of link (NW-Relay link) between UE-NW relay and BS.

In one embodiment the source UE 202 may select a UE-NW relay which fulfills first criteria. In another embodiment, the source UE 202 may select a UE-NW relay which fulfills second criteria.

In one embodiment the Source UE 202 selects UE-NW relay using the first and second criteria as follows:

The Source UE 202 makes a list of candidate relays amongst the discovered relays (i.e. relays from which Source UE 202 has received relay discovery announcement message or relay discovery response message), which fulfils first criteria such as supporting desired connectivity based on information received in relay discovery message. The first criteria is fulfilled if the Relay Service Code received in the relay discovery announcement or relay discovery response message is the same as the Relay Service Code for the connectivity service in which Source UE 202 is interested and/or the user Info ID received in the relay discovery announcement or relay discovery response message is the same as the user info ID of UE-NW relay provisioned in Source UE 202 for connectivity service in which the source UE 202 is interested. The relay service code corresponding to connectivity service in which Source UE 202 is interested may be provisioned by network or pre-defined in UE. The User Info ID of UE-NW relay corresponding to connectivity service in which Source UE 202 is interested may be provisioned by network or pre-defined in UE. If not provisioned then source UE 202 does not check for user Info ID while checking first criteria.

Amongst the list of candidate relays selected based on first criteria from the discovered relays, source UE 202 selects relay using second criteria if there is more than one candidate relay. If there is only one candidate relay then that relay is selected. The source UE 202 selects relay from candidate relays using second criteria as follows:

In one embodiment the Source UE 202 considers those relays amongst the candidates for which NW-Relay link quality >=threshold 1 and Source UE-Relay link quality >=threshold 2. In one embodiment, the values of threshold 1 and threshold 2 can be same. Also, the values of Threshold 1 and threshold 2 may be pre-configured or configured by network. If there are multiple relays for which NW-Relay link quality >=threshold 1 and Source UE-Relay link quality >=threshold 2 then source UE 202 down selects as follows:

a) Source UE selects the relay with best NW-Relay link quality; or b) Source UE selects the relay with best Source UE-Relay link quality; or c) Source UE selects the relay with best Q=W1*(NW-Relay link quality)+W2*(Source UE-Relay link quality) W1 can be equal to 1−W2.

In another embodiment the Source UE 202 selects the relay with best NW-Relay link quality amongst the candidate relays with link quality above a threshold wherein the threshold can be configured by the network or can be pre-specified or can be implementation specific. For example, let's say there are four UE-NW relays (relay 1, relay 2, relay 3 and relay 4) in list of candidate relays selected based on first criteria from the discovered relays. Amongst these candidate relays, for relay 1 and relay 3 the NW-Relay link quality is above a threshold. So source UE select the relay with best (highest) NW-Relay link quality value amongst the relay 1 and relay 3.

In another embodiment, the Source UE 202 selects the relay with the best Q=W1*((1−P1)/(P1+P2))*(NW-Relay link quality)+W2*((1−P2)/(P1+P2))*(Source UE-Relay link quality) wherein W1 and W2 are either configured by the network or are pre-specified and P1 is the power budget of the UE-NW Relay and P2 is the power budget of the source UE.

In another embodiment, Source UE selects the relay with best Q=W1*(NW-Relay link quality)+W2*(Source UE-Relay link quality) W1 can be equal to 1−W2.

In another embodiment, the Source UE 202 selects the relay with best source UE-Relay link quality (i.e. highest value of measurement metric e.g. D-RSRP) amongst the relays with source UE-Relay link quality above a threshold.

Here the threshold can be configured by the network or can be pre-specified or can be implementation specific. In other words, amongst the list of candidate relays, source UE 202 finds the relays for which source UE-Relay link quality is above the threshold. Amongst these found relays, source UE selects the relay with best source UE-Relay link quality. For example, let's say there are four UE-NW relays (relay 1, relay 2, relay 3 and relay 4) in list of candidate relays selected based on first criteria from the discovered relays. Amongst these candidate relays, for relay 1 and relay 3 the source UE-Relay link quality is above the threshold. So source UE select the relay with best (highest) source UE-Relay link quality (e.g. D-RSRP) value amongst the relay 1 and relay 3.

In another embodiment, the Source UE 202 selects the relay with best source UE-Relay link quality (i.e. highest value of measurement metric e.g. D-RSRP) amongst the candidate relays with source UE-Relay link quality above a threshold by MinHsyterisis wherein the threshold and MinHsyterisis can be configured by the network or can be pre-specified or can be implementation specific. In other words, amongst the list of candidate relays, source UE 202 finds the relays for which source UE-Relay link quality is above a threshold by MinHsyterisis. Amongst these found relays, source UE selects the relay with best source UE-Relay link quality. For example, let's say there are four UE-NW relays (relay 1, relay 2, relay 3 and relay 4) in list of candidate relays selected based on first criteria from the discovered relays. Amongst these candidate relays, for relay 1 and relay 3 the source UE-Relay link quality is above a threshold by MinHsyterisis. So source UE select the relay with best (highest) source UE-Relay link quality (e.g. D-RSRP) value amongst the relay 1 and relay 3.

In another embodiment, the Source UE selects any relay amongst the relays with source UE-Relay link quality above a threshold wherein the threshold can be configured by the network or can be pre-specified or can be implementation specific. Or Alternately, Source UE selects any relay amongst the relays with source UE-Relay link quality above a threshold by MinHsyterisis wherein the threshold and MinHsyterisis can be configured by the network or can be pre-specified or can be implementation specific.

Alternately, Source UE selects a candidate relay whose D-RSRP exceeds a threshold configured or pre-configured by network by MinHsyterisis.

In another embodiment the Source UE 202 selects UE-NW relay using the first and second criteria as follows:

The source UE 202 makes a list of candidate relays which fulfills the second criteria. The source UE 202 considers a discovered relay (i.e. relay from which it has received the relay discovery announcement or response message) as candidate using second criteria as follows:

In one embodiment, the Source UE 202 select a candidate relay for which NW-Relay link quality >=threshold 1 and Source UE-Relay link quality >=threshold 2. In one embodiment threshold 1 and threshold 2 can be same. Threshold 1 and threshold 2 may be pre-configured or configured by network.

In another embodiment, the Source UE select a candidate relay with NW-Relay link quality above a threshold wherein the threshold can be configured by the network or can be pre-specified or can be implementation specific.

In another embodiment, the Source UE 202 select a candidate relay with Source UE-Relay link quality above a threshold wherein the threshold can be configured by the network or can be pre-specified or can be implementation specific. Alternately, the Source UE 202 select a candidate relay with source UE-Relay link quality above a threshold by MinHsyterisis wherein the threshold and MinHsyterisis can be configured by the network or can be pre-specified or can be implementation specific.

Amongst the list of candidate relays selected based on second criteria, source UE 202 selects a relay using first criteria. The source UE 202 selects relay from candidate relays using first criteria as follows: The Source UE 202 selects amongst these candidates relays the relay which fulfills first criterion such as supporting desired connectivity based on information received in relay discovery message. The first criteria is fulfilled if the Relay Service Code received in the relay discovery announcement or relay discovery response message is the same as the Relay Service Code for the connectivity service in which Source UE 202 is interested and/or the user Info ID received in the relay discovery announcement or response message is the same as the user info ID of UE-NW relay provisioned in Source UE 202 for connectivity service in which the source UE 202 is interested. The relay service code corresponding to connectivity service in which Source UE 202 is interested may be provisioned by network or pre-defined in UE. The User Info ID of UE-NW relay corresponding to connectivity service in which Source UE 202 is interested may be provisioned by network or pre-defined in UE. If not provisioned then source UE 202 does not check for user Info ID while checking first criteria. The relays amongst the candidate relays not meeting the first criteria are discarded. If multiple candidate relays meet the first criteria then UE may select any or one with best link quality (best source UE to UE-NW relay link quality or UE-NW relay to NW link quality or both) amongst the candidate relays meeting the first criteria. If there is only one candidate relay which meet the first criteria then UE select that relay.

The procedure to select relay is performed if source UE has not selected any relay and wants to communicate with network via relay. Alternately, the procedure to select relay is performed if Source UE 202 has already selected relay and is communicating with it and the link quality of Source UE-Relay link of the currently selected relay is below threshold. Alternately, the procedure to select relay is performed if Source UE 202 has already selected relay and is communicating with it and the current UE-NW relay sends a release message.

In one embodiment the Source UE 202 selects UE-NW relay using only the first criteria as follows:

The Source UE 202 makes a list of candidate relays amongst the discovered relays (i.e. relays from which Source UE 202 has received relay discovery announcement message or relay discovery response message), which fulfils first criteria such as supporting desired connectivity based on information received in relay discovery message. The first criteria is fulfilled if the Relay Service Code received in the relay discovery announcement or relay discovery response message is the same as the Relay Service Code for the connectivity service in which Source UE 202 is interested and/or the user Info ID received in the relay discovery announcement or relay discovery response message is the same as the user info ID of UE-NW relay provisioned in Source UE 202 for connectivity service in which the source UE 202 is interested. The relay service code corresponding to connectivity service in which Source UE 202 is interested may be provisioned by network or pre-defined in UE. The User Info ID of UE-NW relay corresponding to connectivity service in which Source UE 202 is interested may be provisioned by network or pre-defined in UE. If not provisioned then source UE 202 does not check for user Info ID while checking first criteria. Amongst the list of candidate relays selected based on first criteria from the discovered relays, source UE 202 selects any relay.

In one embodiment the Source UE 202 selects UE-NW relay using only the second criteria as follows:

In one embodiment the Source UE 202 considers those relays amongst the discovered relays (i.e. relays from which Source UE 202 has received relay discovery announcement message or relay discovery response message), for which NW-Relay link quality >=threshold 1 and Source UE-Relay link quality >=threshold 2. In one embodiment, the values of threshold 1 and threshold 2 can be same. Also, the values of Threshold 1 and threshold 2 may be pre-configured or configured by network. If there are multiple relays for which NW-Relay link quality >=threshold 1 and Source UE-Relay link quality >=threshold 2 then source UE 202 down selects as follows:

a) Source UE selects the relay with best NW-Relay link quality; or b) Source UE selects the relay with best Source UE-Relay link quality; or c) Source UE selects the relay with best Q=W1*(NW-Relay link quality)+W2*(Source UE-Relay link quality) W1 can be equal to 1−W2.

In another embodiment the Source UE 202 selects the relay with best NW-Relay link quality amongst the discovered relays with link quality above a threshold wherein the threshold can be configured by the network or can be pre-specified or can be implementation specific. For example, let's say there are four discovered UE-NW relays (relay 1, relay 2, relay 3 and relay 4). Amongst these discovered relays, for relay 1 and relay 3 the NW-Relay link quality is above a threshold. So source UE select the relay with best (highest) NW-Relay link quality value amongst the relay 1 and relay 3.

In another embodiment, the Source UE 202 selects the relay with the best Q=W1*((1−P1)/(P1+P2))*(NW-Relay link quality)+W2*((1−P2)/(P1+P2))*(Source UE-Relay link quality) wherein W1 and W2 are either configured by the network or are pre-specified and P1 is the power budget of the UE-NW Relay and P2 is the power budget of the source UE.

In another embodiment, Source UE selects the relay with best Q=W1*(NW-Relay link quality)+W2*(Source UE-Relay link quality) W1 can be equal to 1−W2.

In another embodiment, the Source UE 202 selects the relay with best source UE-Relay link quality (i.e. highest value of measurement metric e.g. D-RSRP) amongst the relays with source UE-Relay link quality above a threshold. Here the threshold can be configured by the network or can be pre-specified or can be implementation specific. In other words, amongst the list of discovered relays, source UE 202 finds the relays for which source UE-Relay link quality is above the threshold. Amongst these found relays, source UE selects the relay with best source UE-Relay link quality. For example, let's say there are four discovered UE-NW relays (relay 1, relay 2, relay 3 and relay 4). Amongst these discovered relays, for relay 1 and relay 3 the source UE-Relay link quality is above the threshold. So source UE select the relay with best (highest) source UE-Relay link quality (e.g. D-RSRP) value amongst the relay 1 and relay 3.

In another embodiment, the Source UE 202 selects the relay with best source UE-Relay link quality (i.e. highest value of measurement metric e.g. D-RSRP) amongst the discovered relays with source UE-Relay link quality above a threshold by MinHsyterisis wherein the threshold and MinHsyterisis can be configured by the network or can be pre-specified or can be implementation specific. In other words, amongst the list of discovered relays, source UE 202 finds the relays for which source UE-Relay link quality is above a threshold by MinHsyterisis. Amongst these found relays, source UE selects the relay with best source UE-Relay link quality. For example, let's say there are four discovered UE-NW relays (relay 1, relay 2, relay 3 and relay 4). Amongst these discovered relays, for relay 1 and relay 3 the source UE-Relay link quality is above a threshold by MinHsyterisis. So source UE select the relay with best (highest) source UE-Relay link quality (e.g. D-RSRP) value amongst the relay 1 and relay 3.

In another embodiment, the Source UE selects any relay amongst the discovered relays with source UE-Relay link quality above a threshold wherein the threshold can be configured by the network or can be pre-specified or can be implementation specific. Or Alternately, Source UE selects any relay amongst the relays with source UE-Relay link quality above a threshold by MinHsyterisis wherein the threshold and MinHsyterisis can be configured by the network or can be pre-specified or can be implementation specific.

Figure 3:
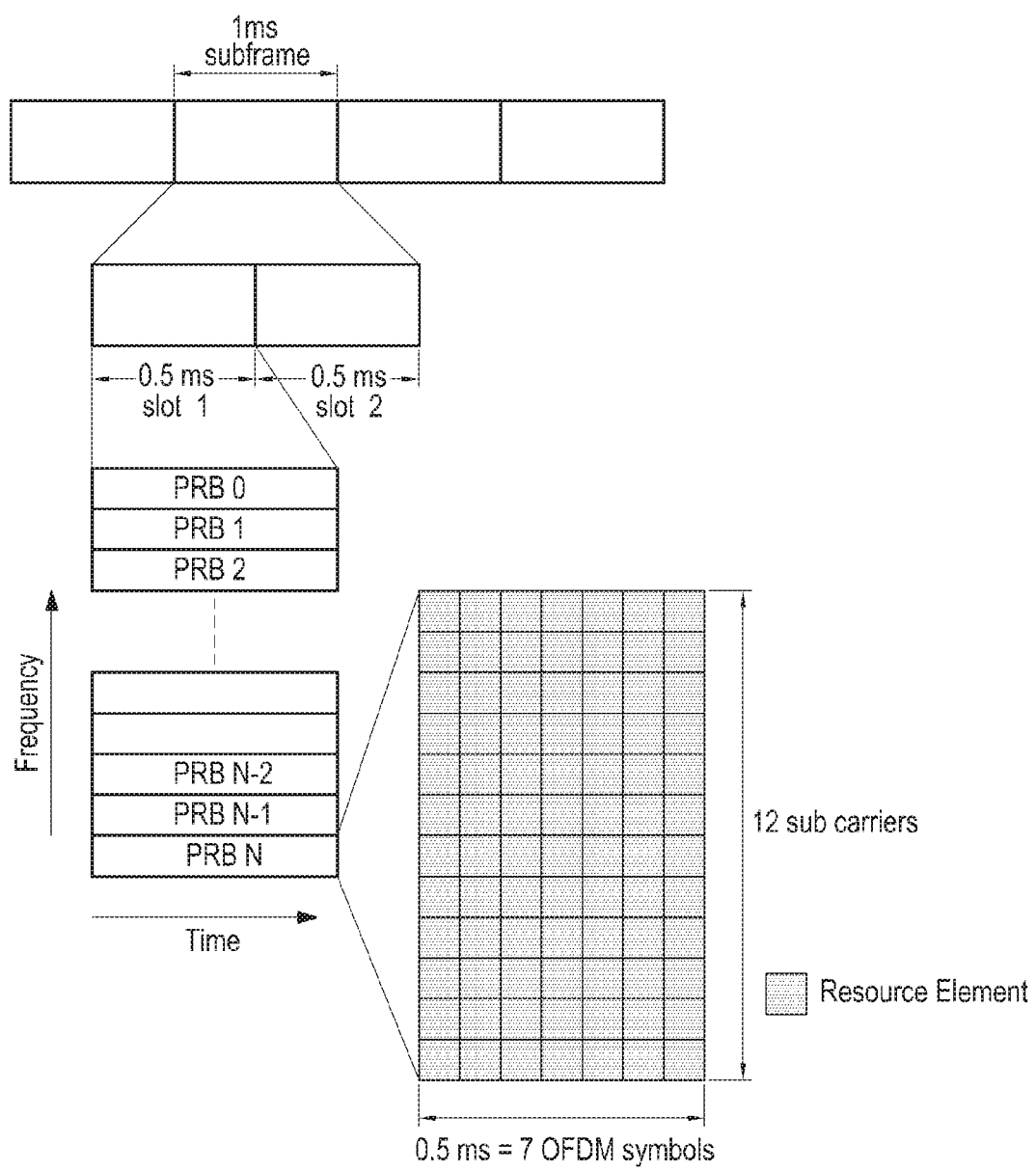
FIG. 3 is a schematic diagram illustrating structure of a sub-frame comprising a plurality of resource elements, according to an embodiment of the present disclosure.

FIG. 3 is a schematic diagram illustrating structure of a sub-frame for transmitting/receiving the discovery message together with DMRS, according to an embodiment of the present disclosure.

The time slot in which discovery is transmitted/received is divided into a plurality of physical resource blocks. Each physical resource block comprise of 84 resource elements as shown in FIG. 3. In case, where one slot has 6 OFDM symbols, then 72 resource elements are there in one resource block. Each OFDM symbol comprises of useful part and CP.

Figure 4:
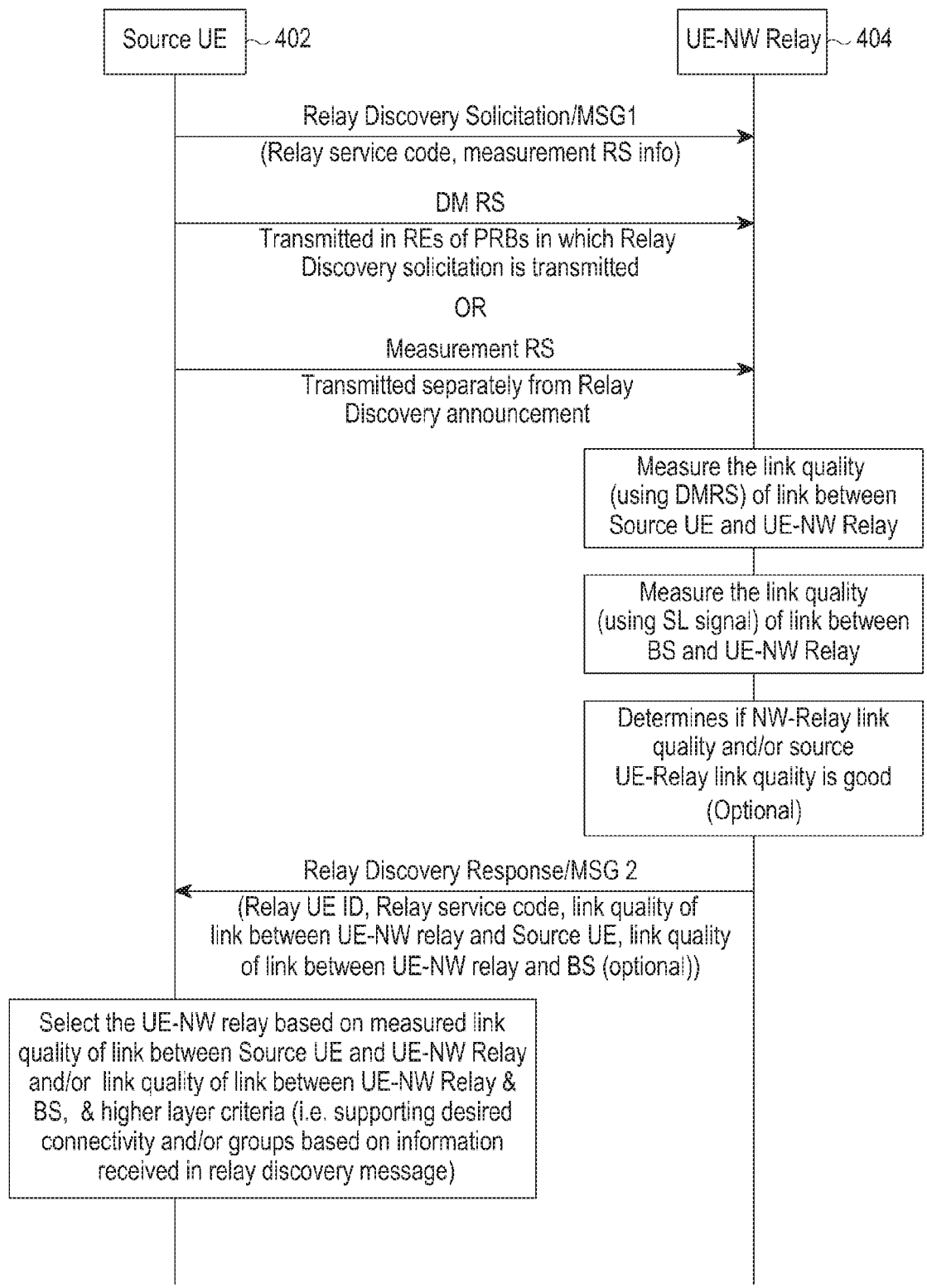
FIG. 4 is a schematic diagram illustrating signal flow for UE-NW relay selection, according to another embodiment of the present disclosure.

FIG. 4 is a schematic diagram illustrating signal flow for UE-NW relay selection, according to another embodiment of the present disclosure. In this embodiment, UE-NW relay 404 is in coverage of network. The UE-NW relay 404 is a UE having the capability to act as relay for relaying the Source UE's traffic to network and vice versa. The Source UE 402 (i.e. UE1) transmits a relay discovery solicitation message (i.e. MSG 1) wherein the message indicates that source UE 402 is searching for a UE-NW relay 404. The MSG 1 is broadcasted by the source UE 402, where the MSG 1 comprises at least one of a Source UE ID (i.e. UE 1 ID), an indicator indicating that UE is searching for UE-NW relay, connectivity information i.e. PDN or APN with which relay should be connected. In one embodiment, the relay discovery solicitation message comprises of relay service code and indicates the information about the connectivity source UE is interested in. The relay discovery solicitation message is transmitted over a Physical D2D Discovery Channel. It is to be noted that discovery messages for other purposes may be transmitted on the Physical D2D Discovery Channel. In an embodiment, the relay discovery solicitation message is distinguished from other discovery messages by a type field in the discovery message. It is to be noted relay discovery announcement message may comprise of other parameters (e.g. security parameters) in addition to those defined in this disclosure.

In one embodiment, in addition to transmitting the MSG 1, the source UE 402 also starts transmitting a reference signal for radio link/channel quality measurement by UE-NW relay 404. The reference signal can be a synchronization signal or any other reference signal (e.g. D2D SS or SRS or new RS or DM RS etc.). The UE-NW relay 404 may identify the reference signal specific to source UE 402 based on sequence identifier and/or time/frequency resource information related to the reference signal. The information (sequence identifier and/or time/frequency resource information) related to reference signal may be transmitted in MSG 1 or alternately UE-NW relay 404 may identify the information related to reference signal using the source UE ID. In one embodiment the information (sequence identifier and/or time/frequency resource information) related to reference signal may be transmitted in separate message (other than MSG1). The separate message may be transmitted after transmitting MSG1 or after receiving MSG 2 from UE-NW relay 404.

In one embodiment, the source UE 402 determines the reference signal related information by monitoring the radio channel for a defined time period to detect the measurement reference signal transmitted by other UEs in its vicinity. The source UE 402 selects a sequence from a set of sequences excluding the detected sequences. The source UE transmits this sequence in measurement reference signal. The time/frequency resource information is fixed/configured by the network and known to all UEs. The selected sequence is used as long as it wants or for a specific time period configured by network in broadcast or dedicated signaling or for the time duration it is performing D2D communication.

In another embodiment, the source UE 402 determines the reference signal related information by randomly selecting the sequence and/or time resource and/or frequency resources for transmitting measurement reference signal. The selected sequence and/or time/frequency resource is used as long as it wants or for a specific time period configured by network in broadcast or dedicated signaling or for the time duration it is performing D2D communication.

In another embodiment, the source UE 402 determines the reference signal related information by requesting the measurement reference signal information from the network (e.g. BS). Network then assigns a unique sequence and/or time/frequency resource for transmission. The selected sequence is used as long as it wants or for a specific time period configured by network in broadcast or dedicated signaling or for the time duration it is performing D2D communication or until the time it is in connected state.

In another embodiment, a base sequence is fixed/configured by the network to UEs. The source UE 402 derives the sequence for transmitting measurement reference signal using its UE ID. The source UE 402 may also derive the time/frequency resource from a set of resources for transmitting measurement of reference signal using its UE ID.

In another embodiment, the source UE 402 transmits the MSG 1 (or relay discovery solicitation message) at short intervals, so that the MSG 1 itself is used for measurement of link between Source UE and UE-NW Relay. DMRS is transmitted in physical resource blocks in which MSG 1 is transmitted and used by UE-NW relay 404 to measure the link quality of link between Source UE 402 and UE-NW Relay 404. For MSG 1, a separate transmission and reception discovery resource pool with shorter discovery period can be configured. Source UE 402 and UE-NW Relay 404 transmits and receives the discovery messages related to relay operation in transmission and reception resource pool designated for relay discovery. Alternately, MSG 1 can be transmitted and received using discovery resources in transmission and reception public safety discovery resource pool(s). In one embodiment, network may indicate whether the public safety discovery resources can be used for relay related discovery messages or not.

The UE-NW relay(s) for which the MSG1 is intended and are willing to relay data communication for Source UE 402 (i.e. UE1) measures the link quality (RSRP or RSRQ or RSSI or CQI) of link (Relay UE-BS link) between itself and network (i.e. BS or eNB) using downlink (DL) signal received from base station. In some embodiments, the UE-NW relay 404 may not be willing to relay if it is overloaded or it does not support PDN/APN connectivity requested by UE. The UE-NW relay 404 also measures the link quality of source UE 402-Relay link using measurement reference signal transmitted by source UE 402. The UE-NW relay 404 determines the measurement RS transmitted by source UE 402 based on measurement RS information received in MSG 1/other message or using the source UE ID.

Alternately, the UE-NW relay 404 measures the link quality using MSG 1 transmitted by Source UE 402. For the measurement of link between source UE 402 and UE-NW relay 404 using the relay discovery messages, the UE-NW relay 404 measures the discovery reference signal received power (D-RSRP). The D-RSRP is defined as the linear average over the power contributions of the resource elements that carry demodulation reference signals associated with PSDCH. The time slot in which discovery is transmitted is divided into physical resource blocks. Each resource block comprise of 84 resource elements as shown in FIG. 4. In case one slot as 6 OFDM symbols then 72 resource elements are there in one resource block. The power per resource element is determined from the energy received during the useful part of the OFDM symbol, excluding the CP. Each OFDM symbol comprises of useful part and CP. The CP is not used as it is affected by signals from other UEs. The UE-NW 404 relay performs multiple measurements over a defined period and averages the measurements done over this defined period.

The UE-NW relay 404 transmits MSG 2 to source UE 402 indicating that the UE-NW relay 404 is willing to relay data communication. In alternate embodiment, the UE-NW relay 404 transmits MSG 2 to source UE 402 indicating that it is willing to relay data communication or new message indicating link quality if network-Relay link quality is greater than a threshold. In alternate embodiment, the UE-NW relay 404 transmits MSG 2 to source UE 402 indicating that it is willing to relay data communication or new message indicating link quality if NW-Relay link quality is greater than a threshold 1 and source UE-Relay link quality is greater than a threshold 2. The values of threshold 1 and threshold 2 may be same. The threshold values may be pre-configured or configured by network. MSG 2 or new message includes the link quality information (CQI or RSSI or RSRP or RSRQ) of NW-Relay link and/or Source UE-Relay Link. The Source UE 402 will receive MSG 2 from multiple relays & Source UE 402 down selects relay using the link quality of NW-Relay link and/or Source UE-Relay link received from each UE-NW relay in MSG2 or new message. The Target UE can include the power budget in addition to link quality in the above embodiments. For example the power budget can be represented in quantized percentage level of the available battery power e.g. 100%, 75%, 50%, 25% etc.

The source UE 402 selects a UE-NW relay which fulfills first criteria and second criteria. According to first criteria ion source UE 402 checks whether UE-NW relay supports desired network connectivity or is of its interest (e.g. supports desired QoS, battery level or UE belongs to his group or friend) based on information received in relay discovery message. According to second criterion source UE 402 checks the link quality of link (Source UE-Relay link) between source UE and UE-NW relay and/or link quality of link (NW-Relay link) between UE-NW relay and BS.

In one embodiment the source UE 402 may select a UE-NW relay which fulfills first criteria. In another embodiment, the source UE 402 may select a UE-NW relay which fulfills second criteria.

In one embodiment the Source UE 402 selects UE-NW relay using the first and second criteria as follows:

The Source UE 402 makes a list of candidate relays amongst the discovered relays which fulfills first criteria such as supporting desired connectivity based on information received in relay discovery response message. The first criteria is fulfilled if the Relay Service Code received in the relay discovery announcement or relay discovery response message is the same as the Relay Service Code for the connectivity service in which Source UE 402 is interested and/or the user Info ID received in the relay discovery announcement or relay discovery response message is the same as the user info ID of UE-NW relay provisioned in Source UE 402 for connectivity service in which the source UE 402 is interested. The relay service code corresponding to connectivity service in which Source UE 402 is interested may be provisioned by network or pre-defined in UE. The User Info ID of UE-NW relay corresponding to connectivity service in which Source UE 402 is interested may be provisioned by network or pre-defined in UE. If not provisioned then source UE 402 does not check for user Info ID while checking first criteria.

Amongst the list of candidate relays selected based on first criteria from the discovered relays, the source UE 402 selects relay using second criteria if there is more than one candidate relay. If there is only one candidate relay then that relay is selected. The source UE 402 selects relay from candidate relays using second criteria as follows:

In one embodiment the Source UE 402 considers those relays amongst the candidates for which NW-Relay link quality >=threshold 1 and Source UE-Relay link quality >=threshold 2. In one embodiment threshold 1 and threshold 2 can be same. Threshold 1 and threshold 2 may be pre-configured or configured by network. If there are multiple relays for which NW-Relay link quality >=threshold 1 and Source UE-Relay link quality >=threshold 2 then source UE down selects as follows:

i. Source UE selects the relay with best NW-Relay link quality or ii. Source UE selects the relay with best Source UE-Relay link quality or iii. Source UE selects the relay with best Q=W1*(NW-Relay link quality)+W2*(Source UE-Relay link quality) W1 can be equal to 1−W2.

In another embodiment the Source UE 402 selects the relay with best NW-Relay link quality amongst the relay with link quality above a threshold wherein the threshold can be configured by the network or can be pre-specified or can be implementation specific.

In another embodiment the Source UE selects the relay with the best Q=W1*((1−P1)/(P1+P2))*(NW-Relay link quality)+W2*((1−P2)/(P1+P2))*(Source UE-Relay link quality) wherein W1 and W2 are either configured by the network or are pre-specified and P1 is the power budget of the UE-NW Relay and P2 is the power budget of the source UE.

In another embodiment, Source UE selects the relay with best Q=W1*(NW-Relay link quality)+W2*(Source UE-Relay link quality) W1 can be equal to 1−W2.

In another embodiment, the Source UE 402 selects the relay with best source UE-Relay link quality amongst the relays with source UE-Relay link quality above a threshold wherein the threshold can be configured by the network or can be pre-specified or can be implementation specific. OR Source UE selects the relay with best source UE-Relay link quality amongst the relays with source UE-Relay link quality above a threshold by MinHsyterisis wherein the threshold and MinHsyterisis can be configured by the network or can be pre-specified or can be implementation specific.

In another embodiment, Source UE selects any relay amongst the relays with source UE-Relay link quality above a threshold wherein the threshold can be configured by the network or can be pre-specified or can be implementation specific. Or Alternately, Source UE selects any relay amongst the relays with source UE-Relay link quality above a threshold by MinHsyterisis wherein the threshold and MinHsyterisis can be configured by the network or can be pre-specified or can be implementation specific. Alternately, Source UE select a candidate relay whose D-RSRP exceeds a threshold configured or pre-configured by network by MinHsyterisis.

In another embodiment the Source UE 402 selects UE-NW relay using the first and second criteria as follows:

The source UE 402 makes a list of candidate relays which fulfills the second criteria. The source UE 402 considers a discovered relay (i.e. relay from which it has received the relay discovery announcement or response message) as candidate using second criteria as follows:

In one embodiment, the Source UE select a candidate relay for which NW-Relay link quality >=threshold 1 and Source UE-Relay link quality >=threshold 2. In one embodiment threshold 1 and threshold 2 can be same. Threshold 1 and threshold 2 may be pre-configured or configured by network.

In another embodiment, the Source UE 402 makes a list of relays with NW-Relay link quality above a threshold wherein the threshold can be configured by the network or can be pre-specified or can be implementation specific.

In another embodiment, the Source UE makes a list of relays with Source UE-Relay link quality above a threshold wherein the threshold can be configured by the network or can be pre-specified or can be implementation specific. Alternately, the Source UE 402 select a candidate relay with source UE-Relay link quality above a threshold by MinHsyterisis wherein the threshold and MinHsyterisis can be configured by the network or can be pre-specified or can be implementation specific.

Amongst the list of candidate relays selected based on second criteria, source UE 402 selects a relay using first criteria. The source UE 402 selects relay from candidate relays using first criteria as follows: The Source UE 402 selects amongst these candidates relays the relay which fulfills first criterion such as supporting desired connectivity based on information received in relay discovery message. The first criteria is fulfilled if the Relay Service Code received in the relay discovery announcement or relay discovery response message is the same as the Relay Service Code for the connectivity service in which Source UE 402 is interested and/or the user Info ID received in the relay discovery announcement or response message is the same as the user info ID of UE-NW relay provisioned in Source UE 402 for connectivity service in which the source UE 402 is interested. The relay service code corresponding to connectivity service in which Source UE 402 is interested may be provisioned by network or pre-defined in UE. The User Info ID of UE-NW relay corresponding to connectivity service in which Source UE 402 is interested may be provisioned by network or pre-defined in UE. If not provisioned then source UE 402 does not check for user Info ID while checking first criteria The relays amongst the candidate relays not meeting the first criteria are discarded. If multiple candidate relays meet the first criteria then UE may select any or one with best link quality (best source UE to UE-NW relay link quality or UE-NW relay to NW link quality or both) amongst the candidate relays meeting the first criteria. If there is only one candidate relay which meet the first criteria then UE select that relay.

The procedure to select relay is performed if source UE has not selected any relay and wants to communicate with network via relay. Alternately, the procedure to select relay is performed if Source UE 402 has already selected relay and is communicating with it and the link quality of Source UE-Relay link of the currently selected relay is below threshold. Alternately, the procedure to select relay is performed if Source UE 402 has already selected relay and is communicating with it and the current UE-NW relay sends a release message.

In one embodiment the Source UE 402 selects UE-NW relay using only the first criteria as follows:

The Source UE 402 makes a list of candidate relays amongst the discovered relays (i.e. relays from which Source UE 402 has received relay discovery announcement message or relay discovery response message), which fulfils first criteria such as supporting desired connectivity based on information received in relay discovery message. The first criteria is fulfilled if the Relay Service Code received in the relay discovery announcement or relay discovery response message is the same as the Relay Service Code for the connectivity service in which Source UE 402 is interested and/or the user Info ID received in the relay discovery announcement or relay discovery response message is the same as the user info ID of UE-NW relay provisioned in Source UE 202 for connectivity service in which the source UE 402 is interested. The relay service code corresponding to connectivity service in which Source UE 402 is interested may be provisioned by network or pre-defined in UE. The User Info ID of UE-NW relay corresponding to connectivity service in which Source UE 402 is interested may be provisioned by network or pre-defined in UE. If not provisioned then source UE 402 does not check for user Info ID while checking first criteria. Amongst the list of candidate relays selected based on first criteria from the discovered relays, source UE 402 selects any relay.

In one embodiment the Source UE 402 selects UE-NW relay using only the second criteria as follows:

In one embodiment the Source UE 402 considers those relays amongst the discovered relays (i.e. relays from which Source UE 402 has received relay discovery announcement message or relay discovery response message), for which NW-Relay link quality >=threshold 1 and Source UE-Relay link quality >=threshold 2. In one embodiment, the values of threshold 1 and threshold 2 can be same. Also, the values of Threshold 1 and threshold 2 may be pre-configured or configured by network. If there are multiple relays for which NW-Relay link quality >=threshold 1 and Source UE-Relay link quality >=threshold 2 then source UE 402 down selects as follows:

a) Source UE selects the relay with best NW-Relay link quality; or b) Source UE selects the relay with best Source UE-Relay link quality; or c) Source UE selects the relay with best Q=W1*(NW-Relay link quality)+W2*(Source UE-Relay link quality) W1 can be equal to 1−W2.

In another embodiment the Source UE 402 selects the relay with best NW-Relay link quality amongst the discovered relays with link quality above a threshold wherein the threshold can be configured by the network or can be pre-specified or can be implementation specific. For example, let's say there are four discovered UE-NW relays (relay 1, relay 2, relay 3 and relay 4). Amongst these discovered relays, for relay 1 and relay 3 the NW-Relay link quality is above a threshold. So source UE select the relay with best (highest) NW-Relay link quality value amongst the relay 1 and relay 3.

In another embodiment, the Source UE 402 selects the relay with the best Q=W1*((1−P1)/(P1+P2))*(NW-Relay link quality)+W2*((1−P2)/(P1+P2))*(Source UE-Relay link quality) wherein W1 and W2 are either configured by the network or are pre-specified and P1 is the power budget of the UE-NW Relay and P2 is the power budget of the source UE.

In another embodiment, Source UE selects the relay with best Q=W1*(NW-Relay link quality)+W2*(Source UE-Relay link quality) W1 can be equal to 1−W2.

In another embodiment, the Source UE 402 selects the relay with best source UE-Relay link quality (i.e. highest value of measurement metric e.g. D-RSRP) amongst the relays with source UE-Relay link quality above a threshold. Here the threshold can be configured by the network or can be pre-specified or can be implementation specific. In other words, amongst the list of discovered relays, source UE 402 finds the relays for which source UE-Relay link quality is above the threshold. Amongst these found relays, source UE selects the relay with best source UE-Relay link quality. For example, let's say there are four discovered UE-NW relays (relay 1, relay 2, relay 3 and relay 4). Amongst these discovered relays, for relay 1 and relay 3 the source UE-Relay link quality is above the threshold. So source UE select the relay with best (highest) source UE-Relay link quality (e.g. D-RSRP) value amongst the relay 1 and relay 3.

In another embodiment, the Source UE 402 selects the relay with best source UE-Relay link quality (i.e. highest value of measurement metric e.g. D-RSRP) amongst the discovered relays with source UE-Relay link quality above a threshold by MinHsyterisis wherein the threshold and MinHsyterisis can be configured by the network or can be pre-specified or can be implementation specific. In other words, amongst the list of discovered relays, source UE 402 finds the relays for which source UE-Relay link quality is above a threshold by MinHsyterisis. Amongst these found relays, source UE selects the relay with best source UE-Relay link quality. For example, let's say there are four discovered UE-NW relays (relay 1, relay 2, relay 3 and relay 4). Amongst these discovered relays, for relay 1 and relay 3 the source UE-Relay link quality is above a threshold by MinHsyterisis. So source UE select the relay with best (highest) source UE-Relay link quality (e.g. D-RSRP) value amongst the relay 1 and relay 3.

In another embodiment, the Source UE selects any relay amongst the discovered relays with source UE-Relay link quality above a threshold wherein the threshold can be configured by the network or can be pre-specified or can be implementation specific. Or Alternately, Source UE selects any relay amongst the relays with source UE-Relay link quality above a threshold by MinHsyterisis wherein the threshold and MinHsyterisis can be configured by the network or can be pre-specified or can be implementation specific.

In an alternate embodiment, the MSG 1 to UE-NW relay is transmitted after receiving the discovery message from UE-NW relay. The UE-NW relay periodically transmits the discovery message.

Figure 5A:
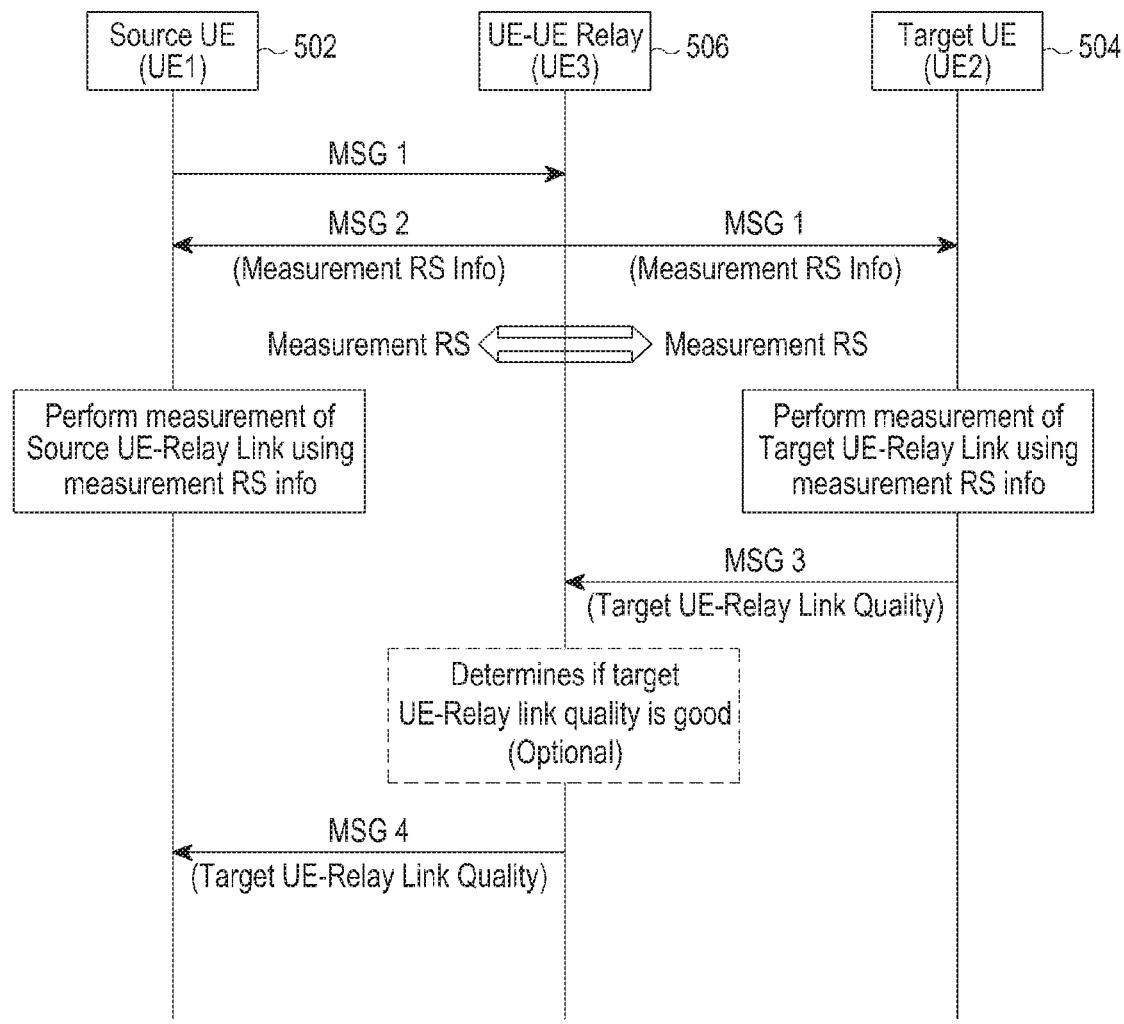
FIG. 5a is a flow diagram illustrating the signaling flow for UE-UE relay selection where Source UE-Relay Link quality is measured by Source UE and Target UE-Relay Link quality is measured by Target UE, according to an embodiment of the present disclosure.

FIG. 5a is a flow diagram illustrating the signaling flow for UE-UE relay selection according to an embodiment of the present disclosure. Here the Source UE-Relay Link quality is measured by the Source UE and Target UE-Relay Link quality is measured by the Target UE. As shown in FIG. 5a, the Source UE 502 (i.e. UE1) transmits a message (i.e. MSG 1) wherein the message indicates that source UE 502 is searching for a UE-UE relay 506 which is in proximity of target UE 504 (i.e. UE 2). In a discovery protocol, the MSG1 is also referred as solicitation message. The MSG 1 is broadcasted by source UE 502. Alternately, the MSG 1 may be group casted to a relay group wherein relay group is a group of UE-UE relays. Alternately, the MSG 1 may be group casted to a group to which the source UE and/or target UE belongs. The MSG 1 comprises of a Source UE ID (i.e. UE 1 ID), a target UE ID (i.e. UE 2 ID) and an indicator indicating that UE is searching for the UE-UE relay 506. The MSG1 may also include additional information like IP version which the UE-UE relay 506 being searched should be supporting, QoS requirement of data communication which the source UE intends to perform using the UE-UE relay, security protocol supported, and the like.

The UE-UE relay(s) for which the MSG1 is intended and are willing to relay data communication for Source UE 502 (i.e. UE1) checks whether the target UE 504 (i.e. UE2) is in its proximity or not. Note that UE-UE relay 506 may not be willing to relay if it is overloaded or it cannot support QoS requested by source UE 502 or it does not support IP version requested by source UE 502 or it does not support security protocol supported by source UE 502 or if its battery power level is low or if the received signal level of MSG1 from UE 1 is below a threshold or for any other reason. In order to search target UE 504, the relay transmits MSG2 to locate target UE. In a discovery protocol, MSG2 is also referred as solicitation message. MSG2 is broadcasted by UE-UE relay 506. Alternately, MSG2 may be group casted to a group to which the source UE 502 and/or target UE 504 belongs. Here the MSG comprises one or more of the Source UE ID (i.e. UE 1 ID), target UE ID (i.e. UE 2 ID), Relay UE ID.

In one embodiment, in addition to transmitting the MSG 2, the UE-UE relay 506 also starts transmitting a reference signal for measuring the link quality by the source UE 502 and the target UE 504. The reference signal can be a synchronization signal or any other reference signal (e.g. D2D SS or SRS or new RS or DM RS etc.). The source UE 502 and target UE 504 may identify the reference signal specific to UE-UE relay 506 based on sequence identifier and/or time/frequency resource information related to reference signal. The information (sequence identifier and/or time/frequency resource information) related to reference signal may be transmitted in MSG 2 by UE-UE relay or alternately source UE 502 and target UE 504 may identify the information related to reference signal using the Relay UE ID. In one embodiment, the information (sequence identifier and/or time/frequency resource information) related to reference signal may be transmitted in a separate message (other than MSG2.)

In one embodiment, the UE-UE relay UE 506 determines the reference signal related information by monitoring the radio channel for defined time period to detect the measurement reference signal transmitted by other UEs in its vicinity. The UE-UE relay UE 506 will select a sequence from a set of sequences excluding the detected sequences. The UE-UE relay UE 506 transmit this sequence in the measurement reference signal. The time/frequency resource information is fixed/configured by network and known to all UEs. The selected sequence is used as long as it wants or for a specific time period configured by network in broadcast or dedicated signaling or for the time duration it is performing D2D communication.

In another embodiment, the UE-UE relay UE 506 determines the reference signal related information by randomly selecting the sequence and/or time resource and/or frequency resources for transmitting measurement reference signal. The selected sequence and/or time/frequency resource is used as long as it wants or for a specific time period configured by network in broadcast or dedicated signaling or for the time duration it is performing D2D communication.

In another embodiment, the UE-UE relay UE 506 determines the reference signal related information by requesting the measurement reference signal information from BS. Then, the BS assigns a unique sequence and/or time/frequency resource for transmission. The selected sequence is used as long as it wants or for a specific time period configured by network in broadcast or dedicated signaling or for the time duration it is performing D2D communication or until the time it is in connected state. In another embodiment, a base sequence is fixed/configured by network to UEs. UEs derive the sequence resources from a set of resources for transmitting measurement reference signal using its UE ID. The UE may also derive the time/frequency resource from a set of resources for transmitting measurement reference signal using its UE ID.

In another embodiment, instead of reference signal transmission for measurement, UE-UE relay 506 transmits the MSG 2 at short intervals for a defined time so that MSG 2 itself can be used for link measurement by source UE 502 and target UE 504. A demodulation reference signal (DMRS) is transmitted in physical resource blocks in which MSG2 is transmitted and used by source UE 502 and target UE 504 for link measurement. In case the MSG 2 is a discovery message, separate transmission and reception discovery resource pool with shorter discovery period can be configured for transmission and reception of MSG 2. Each UE-UE relay transmits MSG 2 to target UE for relaying data communication of source UE when UE-UE relay receives MSG 1. Further, the MSG 2 is not independently transmitted by UE-UE relay to Source UE and Target UE. In this embodiment, for measuring link quality, the usage of reference signal or MSG 2 used can be indicated by UE-UE relay to source and target UE or it can be configured by the network.

In one embodiment, if the target UE 504 (i.e. UE2) receives the MSG 2 from UE-UE relay 506 and willing to communicate with source UE 502 then it starts measuring the link quality (CQI or RSSI or RSRP or RSRQ) with UE-UE relay 506. The Target UE 504 measures the link quality using measurement reference signal transmitted by UE-UE relay 506 or MSG 2. The target UE 504 determines the measurement reference signal transmitted by UE-UE relay 506 based on measurement RS information received in MSG 2/other message or using the relay UE ID. Alternately, the target UE 504 measures the link quality using MSG 2. For the measurement of link between target UE 504 and UE-UE relay 506 using the MSG2, the target UE 504 measures the quantity Discovery Reference Signal Received Power (D-RSRP). The D-RSRP is defined as the linear average over the power contributions of the resource elements that carry demodulation reference signals (DMRS) associated with physical channel on which MSG2 is transmitted. The power per resource element is determined from the energy received during the useful part of the OFDM symbol, excluding the CP. The target UE 504 performs multiple measurements over a defined period and averages the measurements done over this defined period. After measuring link quality the target UE 504 transmits the MSG 3 to relay. In a discovery protocol, the MSG3 is also referred as response message transmitted in response to solicitation message. The MSG 3 includes one or more of the following: Source UE ID (i.e. UE 1 ID), target UE ID (i.e. UE 2 ID), Relay UE ID. The MSG 3 also includes the link quality information (CQI, RSSI or RSRP or RSRQ) of Target UE-Relay link.

The target UE 504 transmits the MSG 3 to relay if target UE-relay link quality is greater than a threshold. The MSG 3 includes one or more of the following: Source UE ID (i.e. UE 1 ID), target UE ID (i.e. UE 2 ID), Relay UE ID. MSG3 also includes the link quality information (CQI, RSSI or RSRP or RSRQ) of Target UE-Relay link wherein the threshold can be configured by the network or can be pre-specified or can be implementation specific.

The target UE 504 transmits the MSG 3 to relay if target UE-relay link quality is greater than a threshold. The MSG 3 includes one or more of the following: Source UE ID (i.e. UE 1 ID), target UE ID (i.e. UE 2 ID), Relay UE ID wherein the threshold can be configured by the network or can be pre-specified or can be implementation specific.

The target UE 504 can include the power budget in addition to link quality in the above embodiments. For example the power budget can be represented in quantized percentage level of the available battery power e.g. 100%, 75%, 50%, 25% etc.

In another embodiment, if the target UE (i.e. UE2) receives the MSG 2 from UE-UE relay and willing to communicate with source UE then target UE transmits the MSG 3 to relay. MSG 3 includes one or more of the following: Source UE ID (i.e. UE 1 ID), target UE ID (i.e. UE 2 ID), Relay UE ID. Target UE does not perform measurement of target UE-relay link.

The source UE 502 also receives the MSG 2 from UE-UE relay 506 and for measuring link quality, the usage of reference signal or MSG 1 used can be indicated by UE-UE relay to source and target UE or it can be configured by the network.

The Source UE 502 measures the link quality of source UE-Relay link for each UE-UE relay from which it receives MSG 2 using measurement reference signal transmitted by UE-UE relay or MSG 2. The Source UE 502 determines the measurement RS transmitted by UE-UE relay 506 based on measurement RS information received in MSG 2/other message or using the relay UE ID. Alternately, the Source UE 502 measures the link quality using MSG 2. For the measurement of link between source UE 502 and UE-UE relay 506 using the MSG2, the Source UE 502 measures discovery reference signal received power (D-RSRP). The D-RSRP is defined as the linear average over the power contributions of the resource elements that carry demodulation reference signals (DMRS) associated with physical channel on which MSG2 is transmitted. The power per resource element is determined from the energy received during the useful part of the OFDM symbol, excluding the CP (cyclic prefix). The Source UE 502 performs multiple measurements over a defined period and averages the measurements performed over this defined period.

The target UE-Relay link quality can be transmitted in another message instead of MSG 3. The message with target UE-Relay link quality is always transmitted after measurement is performed. Alternately the message with target UE-Relay link quality is transmitted if target UE-Relay link quality is greater than threshold.

The UE-UE relay 506 receives the MSG3 transmitted by target UE 504. In one embodiment, the relay transmits MSG 4 to source UE 502 indicating that it is in proximity of target UE 504 and is willing to relay data communication for Source UE 502 to target UE 504. The MSG 4 or a new message includes the link quality information (CQI or RSSI or RSRP or RSRQ) of Target UE-Relay link. The Source UE 502 will receive MSG 4 from multiple relays & Source UE 502 down selects relay using the link quality of Target UE-Relay link received from each UE-UE relay in MSG 4 or new message and Source UE-Relay link measured for each UE-UE relay by source UE.

The Source UE 502 considers those relay for which Target UE-Relay link quality >=threshold 1 and Source UE-Relay link quality >=threshold 2. In one embodiment threshold 1 and threshold 2 can be same. Threshold 1 and threshold 2 may be pre-configured or configured by network. If there are multiple relays for which Target UE-Relay link quality >=threshold 1 and Source UE-Relay link quality >=threshold 2 then source UE down selects a relay UE as follows:

1. Source UE selects the relay with best Target UE-Relay link quality
2. Source UE selects the relay with best Source UE-Relay link quality
3. Source UE selects the relay with best Q=W1*(Target UE-Relay link quality)+W2*(Source UE-Relay link quality) wherein W1 and W2 are either configured by the network or are pre-specified.
4. Source UE selects the relay with the best Q=W1*((1−P1)/(P1+P2))*(Target UE-Relay link quality)+W2*((1−P2)/(P1+P2))*(Source UE-Relay link quality) wherein W1 and W2 are either configured by the network or are pre-specified and P1 is the power budget of the target UE and P2 is the power budget of the source UE.

In another embodiment, Source UE selects the relay with best Q=W1*(Target UE-Relay link quality)+W2*(Source UE-Relay link quality) W1 can be equal to 1−W2.

In an alternate embodiment, the relay transmits MSG 4 to source UE 502 indicating that it is in proximity of target UE and is willing to relay data communication for Source UE 502 to target UE 504 if the Target UE-Relay link is greater than a certain threshold. The Source UE 502 will receive MSG 4 from multiple relays and down selects relay using the link quality of Source UE-Relay link. The Source UE 502 considers those relay for which Source UE-Relay link quality >=threshold. If there are multiple relays for which Source UE-Relay link quality >=threshold, then source UE down selects the relay with best Source UE-Relay link quality.

According to another embodiment herein, the relay transmits MSG 4 to source UE 502 indicating that it is in proximity of target UE 504 and is willing to relay data communication for Source UE 502 to target UE 504. The Target UE-Relay link quality is not received in MSG 3 from Target UE 504. The Source UE 502 will receive MSG 4 from multiple relays and down selects relay using the link quality of Source UE-Relay link. The Source UE 502 considers those relay for which Source UE-Relay link quality >=threshold. If there are multiple relays for which Source UE-Relay link quality >=threshold, then source UE 502 down selects the relay with best Source UE-Relay link quality.

According to another embodiment herein, the relay transmits MSG 4 to source UE 502 indicating that it is in proximity of target UE and is willing to relay data communication for Source UE 502 to target UE 504 if the Target UE-Relay link is greater than a certain threshold. The MSG 4 or new message includes the link quality information (CQI or RSSI or RSRP or RSRQ) of Target UE-Relay link. The Source UE 502 will receive MSG 4 from multiple relays and Source UE 502 down selects relay using the link quality of Target UE-Relay link received in MSG4 or new message and Source UE-Relay link. The Source UE 502 considers those relay for which Target UE-Relay link quality >=threshold 1 and Source UE-Relay link quality >=threshold 2. In one embodiment threshold 1 and threshold 2 can be same. Threshold 1 and threshold 2 may be pre-configured or configured by network. If there are multiple relays for which Target UE-Relay link quality >=threshold 1 and Source UE-Relay link quality >=threshold 2 then source UE down selects as follows:

1. Source UE selects the relay with best Target UE-Relay link quality or
2. Source UE selects the relay with best Source UE-Relay link quality or
3. Source UE selects the relay with best Q=W1*(Target UE-Relay link quality)+W2*(Source UE-Relay link quality) wherein the threshold can be configured by the network or can be pre-specified or can be implementation specific.
4. Source UE selects the relay with the best Q=W1*((1−P1)/(P1+P2))*(Target UE-Relay link quality)+W2*((1−P2)/(P1+P2))*(Source UE-Relay link quality) wherein W1 and W2 are either configured by the network or are pre-specified and P1 is the power budget of the target UE and P2 is the power budget of the source UE.

In another embodiment, Source UE selects the relay with best Q=W1*(Target UE-Relay link quality)+W2*(Source UE-Relay link quality) W1 can be equal to 1−W2.

The selection of relay down using Target UE-Relay link quality and/or Source UE-Relay link quality explained in the above embodiments can be used in other signaling flows for UE-UE relay based D2D communication and as and when needed by source UE.

Figure 5B:
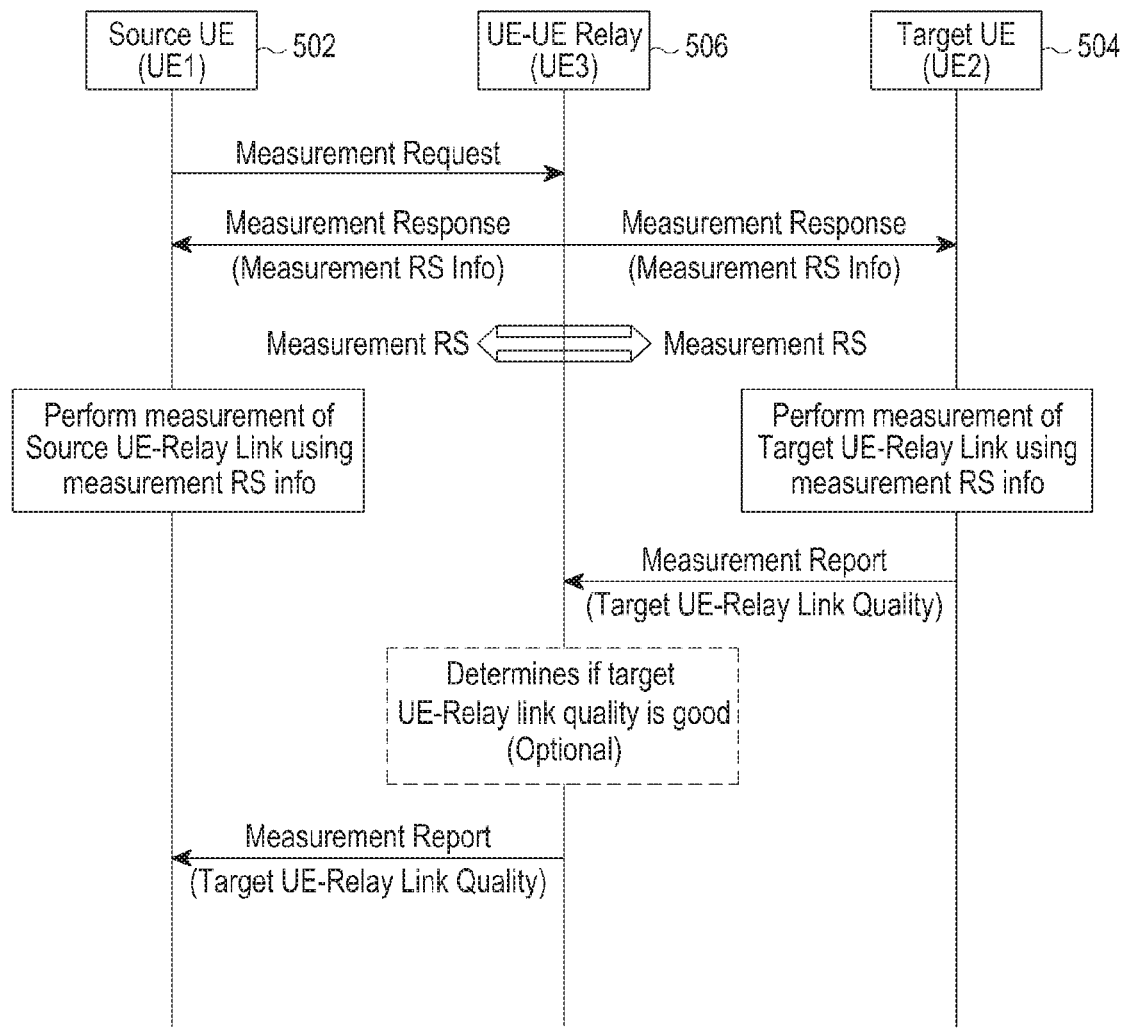
FIG. 5b is a flow diagram illustrating the signaling flow for UE-UE relay selection where Source UE-Relay Link quality is measured by Source UE and Target UE-Relay Link quality is measured by Target UE, according to another embodiment of the present disclosure.

The signaling flow for relay selection according to an alternate embodiment of the present disclosure is illustrated in FIG. 5b. According to FIG. 5b, measurement related messages are triggered by source UE after one or more UE-UE relay in proximity of target UE 504 is found by source UE. Note that FIG. 5b illustrates signaling with one UE-UE relay and same is performed for each UE-UE relay found by source UE. The actions performed by Source UE, target UE 504 and UE-UE relay with respect to measurement are same as defined in signaling flow of FIG. 5a.

Figure 6A:
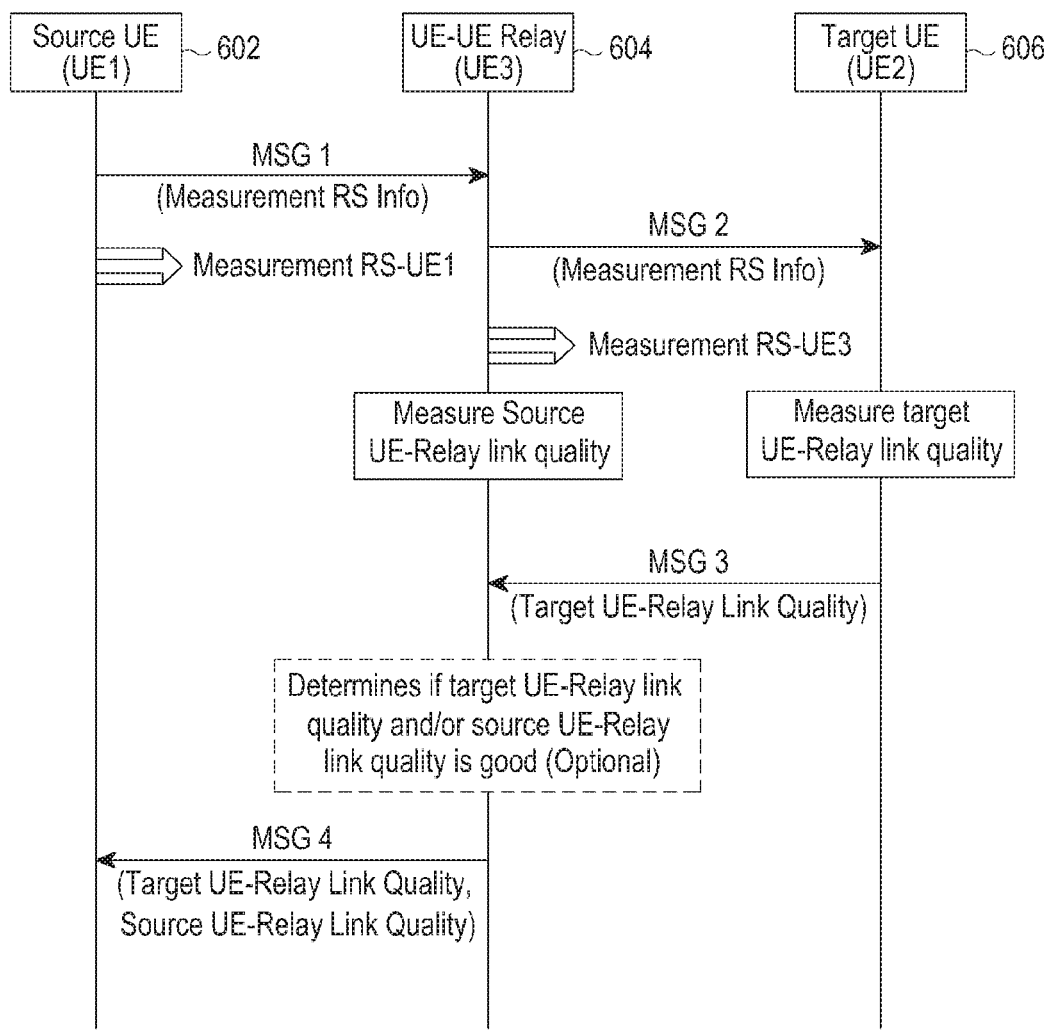
FIG. 6a is a flow diagram illustrating the signaling flow for UE-UE relay selection where Source UE-Relay Link quality is measured by Relay and Target UE-Relay Link quality is measured by Target UE, according to an embodiment of the present disclosure.

FIG. 6a is a flow diagram illustrating the signaling flow for UE-UE relay selection where Source UE-Relay Link quality is measured by Relay and Target UE-Relay Link quality is measured by Target UE, according to an embodiment of the present disclosure. The Source UE (i.e. UE1) 602 transmits a message (i.e. MSG 1) wherein the message indicates that source UE 602 is searching for a UE-UE relay which is in proximity of target UE (i.e. UE 2) 606. In a discovery protocol, MSG1 is also referred as solicitation message. MSG 1 is broadcasted by source UE 602. Alternately it may be group casted to a relay group wherein relay group is a group of UE-UE relays. Alternately it may be group casted to a group to which the source UE and/or target UE belongs. The MSG 1 comprises of a Source UE ID (i.e. UE 1 ID), target UE ID (i.e. UE 2 ID), indicator indicating that UE is searching for UE-UE relay. MSG1 may also include additional information like IP version which the relay should be supporting, QoS requirement of data communication which the source UE intends to perform using the relay, security protocol supported, etc.

In one embodiment, in addition to transmitting the MSG 1, the source UE 602 also starts transmitting a reference signal for link quality measurement by UE-UE relay 604. The reference signal can be a synchronization signal or any other reference signal (e.g. D2D SS or SRS or new RS or DM RS etc.). The UE-UE relay 604 may identify the reference signal specific to source UE based on sequence identifier and/or time/frequency resource information related to reference signal. The information (sequence identifier and/or time/frequency resource information) related to reference signal may be transmitted in MSG 1 or UE-UE relay 604 may identify the information related to reference signal using the source UE ID. In one embodiment the information (sequence identifier and/or time/frequency resource information) related to reference signal may be transmitted in a separate message (other than MSG 1.)

According to an embodiment herein, the Source UE 602 determines the reference signal related information as follows. In one embodiment source UE monitors the radio channel for a specific time period to detect the measurement reference signal transmitted by other UEs in its vicinity. UE-UE relay 604 will select a sequence from a set of sequences excluding the detected sequences. UE-UE relay 604 transmit this sequence in a measurement reference signal. The time/frequency resource information is fixed/configured by network and known to all UEs. The selected sequence is used as long as it wants or for a specific time period configured by network in broadcast or dedicated signaling or for the time duration it is performing D2D communication.

In another embodiment, the source UE 602 randomly selects the sequence and/or time resource and/or frequency resources for transmitting measurement reference signal. The selected sequence and/or time/frequency resource is used as long as it wants or for a specific time period configured by network in broadcast or dedicated signaling or for the time duration it is performing D2D communication.

In another embodiment, the source UE 602 requests the measurement reference signal information from the base station (BS). The BS assigns a unique sequence and/or time/frequency resource for transmission. The selected sequence is used as long as it wants or for a specific time period configured by network in broadcast or dedicated signaling or for the time duration it is performing D2D communication or until the time it is in connected state.

In another embodiment, a base sequence is fixed/configured by the network to UEs. The UEs derive the sequence for transmitting measurement reference signal using its UE ID. The UE may also derive the time/frequency resource from a set of resources for transmitting measurement reference signal using its UE ID.

In another embodiment instead of transmitting measurement RS, the Source UE 602 transmits the MSG 1 at short intervals for a defined time so that MSG 1 itself can be used for link measurement by UE-UE relay 604. In case the MSG 1 is a discovery message, separate discovery resource pool with shorter discovery period can be configured for transmission of MSG 1.

The UE-UE relay(s) for which the MSG1 is intended and are willing to relay data communication for Source UE (i.e. UE1) 602 checks whether the target UE (i.e. UE2) 606 is in its proximity or not. Note that relay may not be willing to relay if it is overloaded or it cannot support QoS requested by source UE or it does not support IP version requested by source UE or it does not support security protocol supported by the source UE 602. In order to search the target UE 606, the UE-UE relay 604 transmits MSG 2 to locate the UE2. In a discovery protocol MSG2 is also referred as solicitation message. The MSG 2 is broadcasted by the relay. Alternately it may be group casted to a group to which the source UE 602 and/or target UE 606 belongs. The MSG 2 comprises one or more of a Source UE ID (i.e. UE 1 ID), target UE ID (i.e. UE 2 ID) and a Relay UE ID.

In one embodiment, in addition to transmitting the MSG 2, the relay 604 also starts transmitting a reference signal for link quality measurement by the target UE 606. The reference signal can be a synchronization signal or any other reference signal (e.g. D2D SS or SRS or new RS etc.). The target UE 606 may identify the reference signal specific to UE-UE relay based on sequence identifier and/or time/frequency resource information related to reference signal. The information (sequence identifier and/or time/frequency resource information) related to the reference signal may be transmitted in MSG 2 or the target UE 606 may identify the information related to reference signal using the relay UE ID. In one embodiment the information (sequence identifier and/or time/frequency resource information) related to reference signal may be transmitted in separate message (other than MSG 2.)

According to an embodiment herein, the UE-UE relay 602 monitors the radio channel for a specific time period to detect the measurement reference signal transmitted by other UEs in its vicinity. The UE-UE relay 604 will select a sequence from a set of sequences excluding the detected sequences. UE-UE relay transmits this sequence in measurement reference signal. The time/frequency resource information is fixed/configured by network and known to all UEs. The selected sequence is used as long as it wants or for a specific time period configured by network in broadcast or dedicated signaling or for the time duration it is performing D2D communication.

According to another embodiment herein, the UE-UE relay randomly selects the sequence and/or time resource and/or frequency resources for transmitting measurement reference signal. The selected sequence and/or time/frequency resource is used as long as it wants or for a specific time period configured by network in broadcast or dedicated signaling or for the time duration it is performing D2D communication.

According to an embodiment of the present disclosure, the UE requests the measurement reference signal information from the base station. The base station assigns a unique sequence and/or time/frequency resource for transmission. The selected sequence is used as long as it wants or for a specific time period configured by network in broadcast or dedicated signaling or for the time duration it is performing D2D communication or until the time it is in connected state.

In another embodiment, a base sequence is fixed/configured by network to UEs. The UEs derive the sequence for transmitting measurement reference signal using its UE ID. The UE may also derive the time/frequency resource from a set of resources for transmitting measurement reference signal using its UE ID.

In another embodiment instead of reference signal transmission for measurement, the Relay UE transmits the MSG 2 at short intervals for a defined time so that MSG 2 itself can be used for link measurement by target UE 606. A demodulation reference signal (DMRS) is transmitted in physical resource blocks in which MSG 2 is transmitted and used by target UE 606 to measure the link quality. In case the MSG 2 is a discovery message separate transmission and reception discovery resource pool with shorter discovery period can be configured for transmission and reception of MSG 2.

The UE-UE relay measures the source UE-Relay link quality using measurement reference signal transmitted by the source UE or MSG 1. The UE-UE relay determines the measurement RS transmitted by the source UE based on measurement RS information received in MSG 1/other message or using the source UE ID. Alternately, the UE-UE relay measures the link quality using MSG 1 transmitted by source UE. For the measurement of link quality the UE-UE relay measures the discovery reference signal received power (D-RSRP). The D-RSRP is defined as the linear average over the power contributions of the resource elements that carry demodulation reference signals (DMRS) associated with physical D2D discovery channel. The power per resource element is determined from the energy received during the useful part of the OFDM symbol, excluding the CP.UE-UE relay performs multiple measurements over a defined period and averages the measurements done over this defined period.

In one embodiment, if the target UE (i.e. UE2) 606 receives the MSG 2 from UE-UE relay and willing to communicate with source UE then it starts measuring the link quality with UE-UE relay. Target UE 606 measures the link quality using measurement reference signal transmitted by UE-UE relay or MSG 2. Target UE 606 determines the measurement RS transmitted by UE-UE relay based on measurement RS information received in MSG 2/other message or using the relay UE ID. Alternately, the target UE 606 measures the link quality using MSG 2 transmitted by UE-UE relay. For the measurement of link quality the Target UE 606 measures the quantity discovery reference signal received power (D-RSRP). The D-RSRP is defined as the linear average over the power contributions of the resource elements that carry demodulation reference signals (DMRS) associated with physical D2D discovery channel. The power per resource element is determined from the energy received during the useful part of the OFDM symbol, excluding the CP.Target UE performs multiple measurements over a defined period and averages the measurements done over this defined period. Further the target UE performs one of the following after the measurement.

a. The target UE 606 transmits the MSG 3 to UE-UE relay. In a discovery protocol MSG3 is also referred as response message. MSG 3 includes one or more of the following: Source UE ID (i.e. UE 1 ID), target UE ID (i.e. UE 2 ID), Relay UE ID. MSG3 also includes the link quality information (CQI or RSSI or RSRP or RSRQ) of Target UE-Relay link.

b. The target UE 606 transmits the MSG 3 to relay if target UE-relay link quality is greater than a threshold. MSG 3 includes one or more of the following: Source UE ID (i.e. UE 1 ID), target UE ID (i.e. UE 2 ID), Relay UE ID. MSG3 also includes the link quality information (CQI or RSSI or RSRP or RSRQ) of Target UE-Relay link.

c. The target UE 606 transmits the MSG 3 to relay if target UE-relay link quality is greater than a threshold. MSG 3 includes one or more of the following: Source UE ID (i.e. UE 1 ID), target UE ID (i.e. UE 2 ID), Relay UE ID.

The target UE 606 can include the power budget in addition to link quality in the above embodiments. For example the power budget can be represented in quantized percentage level of the available battery power e.g. 100%, 75%, 50%, 25% etc.

In another embodiment, if the target UE (i.e. UE2) 606 receives the MSG 2 from the UE-UE relay and willing to communicate with source UE then target UE 606 transmits the MSG 3 to relay. The MSG 3 includes one or more of a Source UE ID (i.e. UE 1 ID), target UE ID (i.e. UE 2 ID), Relay UE ID. Target UE 606 does not perform measurement of target UE-relay link.

According to an embodiment herein, the target UE-Relay link quality can be transmitted in another message instead of MSG 3. The message with target UE-Relay link quality is always transmitted after measurement is done. Alternately the message with target UE-Relay link quality is transmitted if target UE-Relay link quality is greater than threshold. The UE-UE relay receives the MSG 3 transmitted by the target UE 606.

In one embodiment, the relay transmits MSG 4 to the source UE indicating that it is in proximity of the target UE 606 and is willing to relay data communication for Source UE to the target UE 606. In an alternate embodiment, the relay transmits MSG 4 to source UE indicating that it is in proximity of target UE 606 and is willing to relay data communication for Source UE to target UE 606 if target UE-Relay link quality is greater than a threshold. In alternate embodiment, the relay transmits MSG 4 to source UE indicating that it is in proximity of target UE 606 and is willing to relay data communication for Source UE to target UE 606 if target UE-Relay link quality is greater than a threshold 1 and source UE-Relay link quality is greater than threshold 2. Threshold 1 and threshold 2 may be same. Threshold values may be pre-configured or configured by network. MSG 4 or new message includes the link quality information (RSSI or RSRP or RSRQ) of Target UE-Relay link and/or Source UE-Relay Link. Source UE will receive MSG 4 from multiple relays & Source UE down selects relay using the link quality of Target UE-Relay link received in MSG 4 or new message and/or Source UE-Relay link received from each UE-UE relay.

The target UE-Relay link quality and Source UE-Relay link quality received from each UE-UE relay is as follows. The Source UE considers those relay for which Target UE-Relay link quality >=threshold 1 and Source UE-Relay link quality >=threshold 2. In one embodiment threshold 1 and threshold 2 can be same. Threshold 1 and threshold 2 may be pre-configured or configured by network.

If there are multiple relays for which Target UE-Relay link quality >=threshold 1 and Source UE-Relay link quality >=threshold 2 then source UE down selects as follows:

a. Source UE selects the relay with best Target UE-Relay link quality or b. Source UE selects the relay with best Source UE-Relay link quality or c. Source UE selects the relay with best Q=W1*(Target UE-Relay link quality)+W2*(Source UE-Relay link quality) wherein the threshold can be configured by the network or can be pre-specified or can be implementation specific.

d. Source UE selects the relay with the best Q=W1*((1−P1)/(P1+P2))*(Target UE-Relay link quality)+W2*((1−P2)/(P1+P2))*(Source UE-Relay link quality) wherein W1 and W2 are either configured by the network or are pre-specified and P1 is the power budget of the target UE 606 and P2 is the power budget of the source UE.

Target UE-Relay link quality received from each UE-UE relay: Source UE selects the relay with best Target UE-Relay link quality.

Source UE-Relay link quality received from each UE-UE relay: Source UE selects the relay with best source UE-Relay link quality.

In another embodiment, Source UE selects the relay with best Q=W1*(Target-Relay link quality)+W2*(Source UE-Relay link quality) W1 can be equal to 1−W2.

According to an embodiment herein, the method of relay down selection using Target UE-Relay link quality and/or Source UE-Relay link quality can be used in other signaling flows for UE-UE relay based D2D communication and as and when needed by the source UE.

Figure 6B:
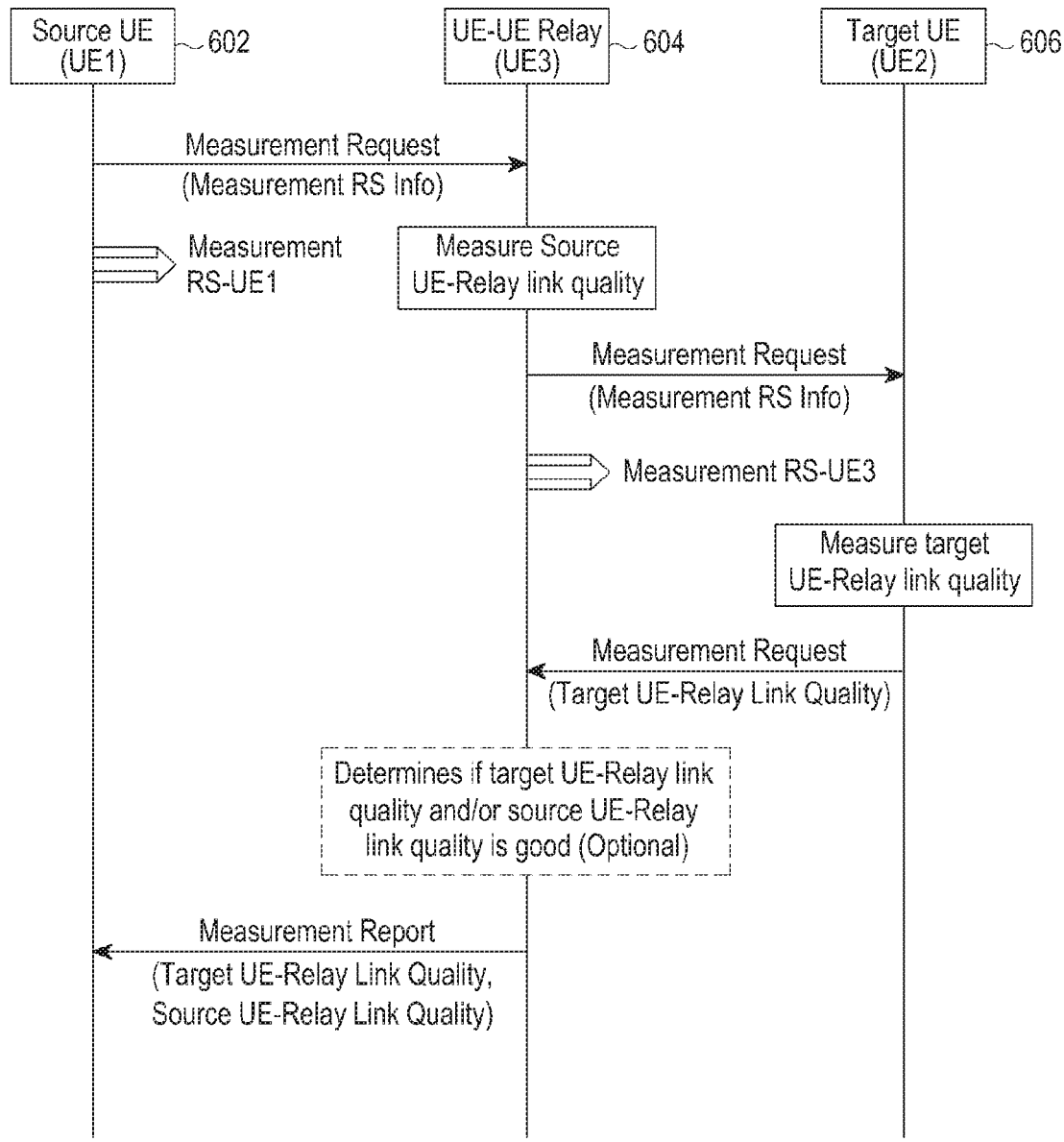
FIG. 6b is a flow diagram illustrating the signaling flow for UE-UE relay selection where Source UE-Relay Link quality is measured by Relay and Target UE-Relay Link quality is measured by Target UE, according to another embodiment of the present disclosure.

FIG. 6b is a flow diagram illustrating the signaling flow for UE-UE relay selection where Source UE-Relay Link quality is measured by Relay and Target UE-Relay Link quality is measured by Target UE 606, according to another embodiment of the present disclosure. The actions performed by Source UE, target UE 606 and UE-UE relay with respect to measurement are same as defined in signaling flow of FIG. 6a.

Figure 7A:
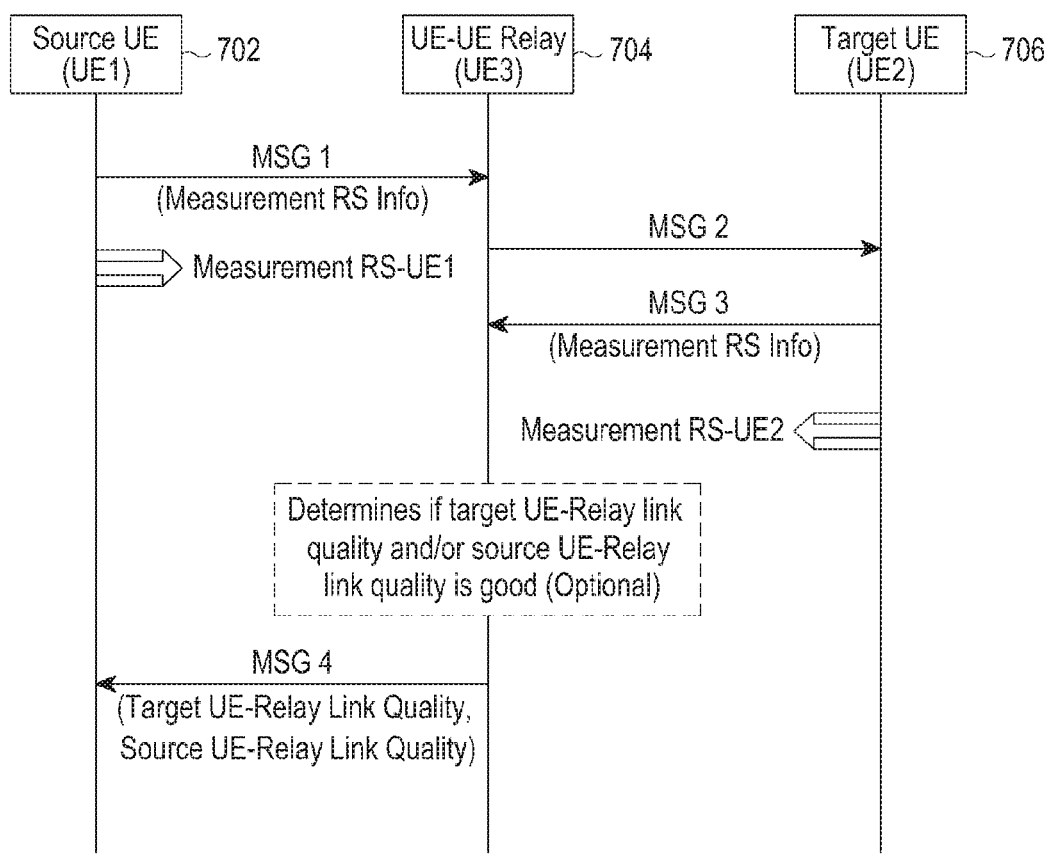
FIG. 7a is a flow diagram illustrating the signaling flow for UE-UE relay selection where Source UE-Relay Link quality is measured by Relay and Target UE-Relay Link quality is measured by Relay, according to an embodiment of the present disclosure.

FIG. 7a is a flow diagram illustrating the signaling flow for UE-UE relay selection where Source UE-Relay Link quality is measured by Relay and Target UE-Relay Link quality is measured by Relay, according to an embodiment of the present disclosure. The source UE (i.e. UE1) 702 transmits a message (i.e. MSG 1) wherein the message indicates that source UE is searching for a UE-UE relay which is in proximity of target UE (i.e. UE 2) 706. MSG 1 is broadcasted by source UE. Alternately it may be group casted to a relay group wherein relay group is a group of UE-UE relays. Alternately it may be group casted to a group to which the source UE and/or target UE 706 belongs. MSG 1 includes one or more of the following: Source UE ID (i.e. UE 1 ID), target UE ID (i.e. UE 2 ID), indicator indicating that UE is searching for UE-UE relay. MSG1 may also include additional information like IP version which the relay should be supporting, QoS requirement of data communication which the source UE intends to perform using the relay, security protocol supported, and the like.

According to an embodiment of the present disclosure, in addition to transmitting the MSG 1, the source UE also starts transmitting a reference signal for link quality measurement by UE-UE relay. The reference signal can be a synchronization signal or any other reference signal (e.g. D2D SS or SRS or new RS or DM RS etc.). The UE-UE relay may identify the reference signal specific to source UE based on sequence identifier and/or time/frequency resource information related to reference signal. The information (sequence identifier and/or time/frequency resource information) related to reference signal may be transmitted in MSG 1 or UE-UE relay may identify the information related to reference signal using the source UE ID In one embodiment the information (sequence identifier and/or time/frequency resource information) related to reference signal may be transmitted in separate message (other than MSG 1).

The Source UE determines the reference signal related information as follows.

a. The Source UE monitors the radio channel for a specific time period to detect the measurement reference signal transmitted by other UEs in its vicinity. Source UE will select a sequence from a set of sequences excluding the detected sequences. Source UE transmit this sequence in measurement reference signal. The time/frequency resource information is fixed/configured by network and known to all UEs. The selected sequence is used as long as it wants or for a specific time period configured by network in broadcast or dedicated signaling or for the time duration it is performing D2D communication.

b. The Source UE randomly selects the sequence and/or time resource and/or frequency resources for transmitting measurement reference signal. The selected sequence and/or time/frequency resource is used as long as it wants or for a specific time period configured by network in broadcast or dedicated signaling or for the time duration it is performing D2D communication.

c. In another embodiment, the UE request the measurement reference signal information from BS. BS assigns a unique sequence and/or time/frequency resource for transmission. The selected sequence is used as long as it wants or for a specific time period configured by network in broadcast or dedicated signaling or for the time duration it is performing D2D communication or until the time it is in connected state.

d. In another embodiment, a base sequence is fixed/configured by network to UEs. UEs derive the sequence for transmitting measurement reference signal using its UE ID. The UE may also derive the time/frequency resource from a set of resources for transmitting measurement reference signal using its UE ID.

In another embodiment, instead of reference signal transmission for measurement, Source UE transmits the MSG 1 at short intervals for a defined time so that MSG 1 itself can be used for link measurement by UE-UE relay. A demodulation reference signal (DMRS) is transmitted in physical resource blocks in which MSG 1 is transmitted and used by UE-UE relay to measure the link quality. In case the MSG 1 is a discovery message, separate transmission and reception discovery resource pool with shorter discovery period can be configured for transmission and reception of MSG 1.

In another embodiment, the UE-UE relay(s) for which the MSG1 is intended and are willing to relay data communication for Source UE (i.e. UE1) checks whether the target UE (i.e. UE2) 706 is in its proximity or not. Note that relay may not be willing to relay if it is overloaded or it cannot support QoS requested by source UE or it does not support IP version requested by source UE or it does not support security protocol supported by source UE. In order to search target UE 706, the relay transmits MSG 2 to locate UE2. MSG 2 is broadcasted by relay. Alternately it may be group casted to a group to which the source UE and/or target UE 706 belongs. MSG 2 includes one or more of the Source UE ID (i.e. UE 1 ID), target UE ID (i.e. UE 2 ID) and Relay UE ID.

According to an embodiment herein, the UE-UE relay measures the source UE-Relay link quality using measurement reference signal transmitted by source UE or MSG 1. UE-UE relay determines the measurement RS transmitted by source UE based on measurement RS information received in MSG 1/other message or using the source UE ID. Alternately, the UE-UE relay measures the link quality using MSG 1 transmitted by source UE. UE-UE relay measures the D-RSRP. The D-RSRP is defined as the linear average over the power contributions of the resource elements that carry DMRS associated with physical D2D discovery channel. The power per resource element is determined from the energy received during the useful part of the OFDM symbol, excluding the CP. UE-UE relay performs multiple measurements over a defined period and averages the measurements done over this defined period.

According to an embodiment herein, if the target UE (i.e. UE2) 706 receives the MSG 2 from UE-UE relay and willing to communicate with source UE then it transmits the MSG 3 to UE-UE relay. MSG 3 includes one or more of the following: Source UE ID (i.e. UE 1 ID), target UE ID (i.e. UE 2 ID), Relay UE ID.

In one embodiment, in addition to transmitting the MSG 3, the target UE 706 also starts transmitting a reference signal for link quality measurement by the UE-UE relay. The reference signal can be a synchronization signal or any other reference signal (e.g. D2D SS or SRS or new RS etc.). The UE-UE relay may identify the reference signal specific to target UE based on sequence identifier and/or time/frequency resource information related to the reference signal. The information (sequence identifier and/or time/frequency resource information) related to the reference signal may be transmitted in MSG 3 or UE-UE relay may identify the information related to the reference signal using the target UE ID. In one embodiment the information (sequence identifier and/or time/frequency resource information) related to reference signal may be transmitted in separate message (other than MSG 3.) The target UE 706 determines the reference signal related information as follows.

a. In one embodiment Target UE 706 monitors the radio channel for a specific time period to detect the measurement reference signal transmitted by other UEs in its vicinity. Target UE 706 will select a sequence from a set of sequences excluding the detected sequences. Target UE 706 transmit this sequence in measurement reference signal. The time/frequency resource information is fixed/configured by network and known to all UEs. The selected sequence is used as long as it wants or for a specific time period configured by network in broadcast or dedicated signaling or for the time duration it is performing D2D communication.

b. In another embodiment, Target UE 706 randomly selects the sequence and/or time resource and/or frequency resources for transmitting measurement reference signal. The selected sequence and/or time/frequency resource is used as long as it wants or for a specific time period configured by network in broadcast or dedicated signaling or for the time duration it is performing D2D communication.

c. In another embodiment, Target UE 706 requests the measurement reference signal information from BS. BS assigns a unique sequence and/or time/frequency resource for transmission. The selected sequence is used as long as it wants or for a specific time period configured by network in broadcast or dedicated signaling or for the time duration it is performing D2D communication or until the time it is in connected state.

d. In another embodiment, a base sequence is fixed/configured by network to UEs. UEs derive the sequence for transmitting measurement reference signal using its UE ID. The UE may also derive the time/frequency resource from a set of resources for transmitting measurement reference signal using its UE ID.

e. In alternate embodiment, instead of reference signal transmission for measurement Target UE 706 transmits the MSG 3 at short intervals for a defined time so that MSG 3 itself can be used for link measurement by UE-UE relay. A demodulation reference signal (DMRS) is transmitted in physical resource blocks in which MSG 3 is transmitted and used by target UE to measure the link quality. In case the MSG 3 is a discovery message separate transmission and reception discovery resource pool with shorter discovery period can be configured for transmission and reception of MSG 3.

According to an embodiment herein, the UE-UE relay receives the MSG3 transmitted by the target UE 706.

a. The UE-UE relay measures the target UE-Relay link quality using measurement reference signal transmitted by target UE 706 or MSG 3 transmitted by MSG 3. UE-UE relay determines the measurement RS transmitted by target UE 706 based on measurement RS information received in MSG 3/other message or using the target UE ID. UE-UE relay performs multiple measurements over a defined period and averages the measurements done over this defined period.

b. The target UE 706 can include the power budget in addition to link quality in the above embodiments. For example the power budget can be represented in quantized percentage level of the available battery power e.g. 100%, 75%, 50%, 25% etc.

c. The relay transmits MSG 4 to source UE indicating that it is in proximity of target UE 706 and is willing to relay data communication for Source UE to target UE 706. In alternate embodiment, the relay transmits MSG 4 to source UE indicating that it is in proximity of target UE 706 and is willing to relay data communication for Source UE to target UE 706 if target UE-Relay link quality is greater than a threshold. In alternate embodiment, the relay transmits MSG 4 to source UE indicating that it is in proximity of target UE 706 and is willing to relay data communication for Source UE to target UE 706 if target UE-Relay link quality is greater than a threshold 1 and source UE-Relay link quality is greater than threshold 2. Threshold 1 and threshold 2 may be same. Threshold values may be pre-configured or configured by network. MSG 4 or new message includes the link quality information (CQI or RSSI or RSRP or RSRQ) of Target UE-Relay link and/or Source UE-Relay Link. Source UE will receive MSG 4 from multiple relays & Source UE down selects relay using the link quality of Target UE-Relay link and/or Source UE-Relay link received from each UE-UE relay in MSG4 or new message.

Target UE-Relay link quality and Source UE-Relay link quality received from each UE-UE relay. The source UE considers those relay for which Target UE-Relay link quality >=threshold 1 and Source UE-Relay link quality >=threshold 2. In one embodiment threshold 1 and threshold 2 can be same. Threshold 1 and threshold 2 may be pre-configured or configured by network. If there are multiple relays for which Target UE-Relay link quality >=threshold 1 and Source UE-Relay link quality >=threshold 2 then source UE down selects as follows:

a. Source UE selects the relay with best Target UE-Relay link quality or b. Source UE selects the relay with best Source UE-Relay link quality or c. Source UE selects the relay with best Q=W1*(Target UE-Relay link quality)+W2*(Source UE-Relay link quality) wherein the threshold can be configured by the network or can be pre-specified or can be implementation specific.

d. Source UE selects the relay with the best Q=W1*((1−P1)/(P1+P2))*(Target UE-Relay link quality)+W2*((1−P2)/(P1+P2))*(Source UE-Relay link quality) wherein W1 and W2 are either configured by the network or are pre-specified and P1 is the power budget of the target UE 706 and P2 is the power budget of the source UE.

In another embodiment, Source UE selects the relay with best Q=W1*(NW-Relay link quality)+W2*(Source UE-Relay link quality) W1 can be equal to 1−W2.

Target UE-Relay link quality only received from each UE-UE relay: The Source UE selects the relay with best Target UE-Relay link quality.

Source UE-Relay link quality only received from each UE-UE relay: The Source UE selects the relay with best source UE-Relay link quality.

According to an embodiment herein, the method of relay down selection using Target UE-Relay link quality and/or Source UE-Relay link quality can be used in other signaling flows for UE-UE relay based D2D communication and as and when needed by source UE.

Figure 7B:
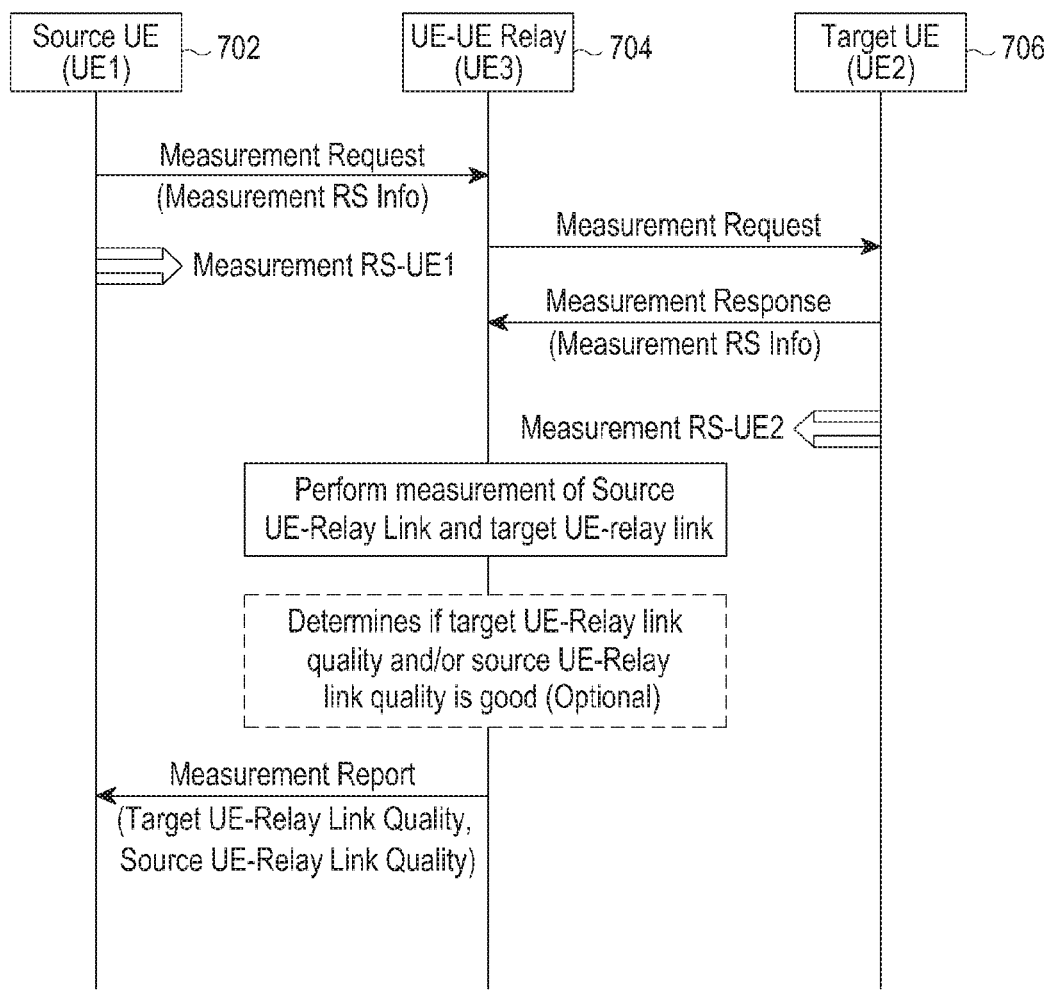
FIG. 7b is a flow diagram illustrating the signaling flow for UE-UE relay selection where Source UE-Relay Link quality is measured by Relay and Target UE-Relay Link quality is measured by Relay, according to another embodiment of the present disclosure.

FIG. 7b is a flow diagram illustrating the signaling flow for UE-UE relay selection where Source UE-Relay Link quality is measured by Relay and Target UE-Relay Link quality is measured by Relay, according to another embodiment of the present disclosure. The actions performed by the Source UE 702, target UE 706 and UE-UE 704 relay with respect to measurement are same as defined in signaling flow of FIG. 7a.

Figure 8:
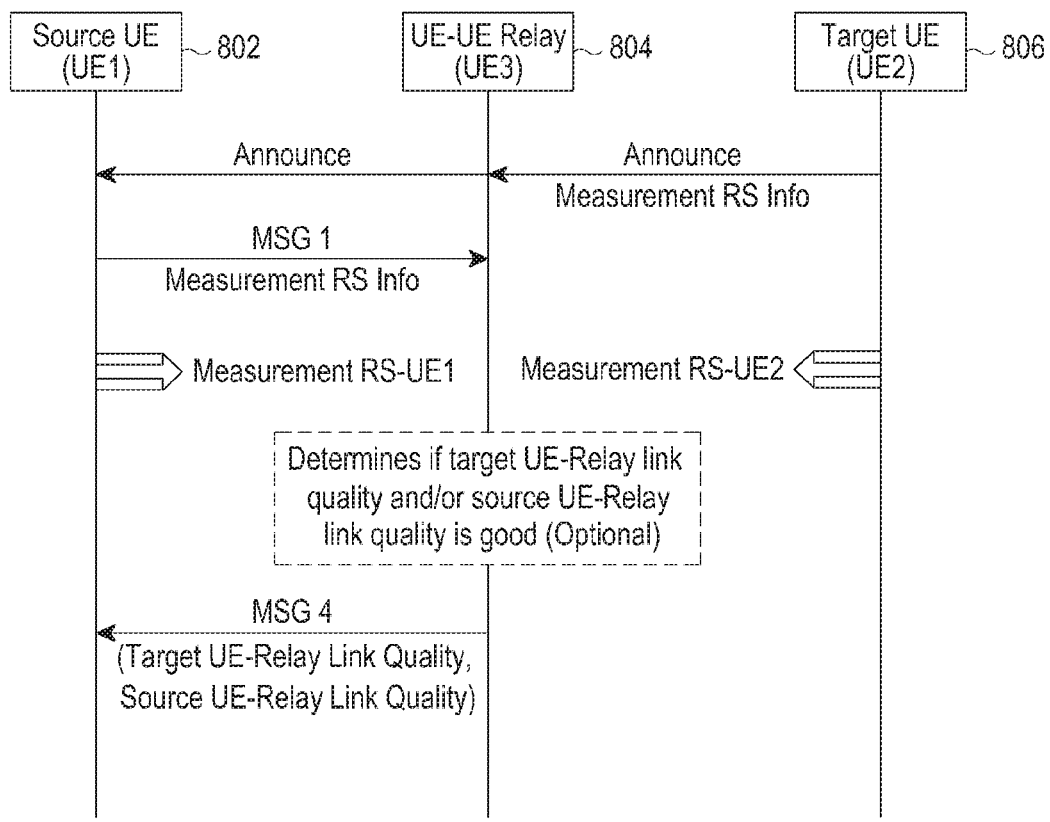
FIG. 8 is a flow diagram illustrating the signaling flow for UE-UE relay selection, according to an embodiment of the present disclosure.

FIG. 8 is a flow diagram illustrating the signaling flow for UE-UE relay selection, according to an embodiment of the present disclosure. The UE-UE relay and target UE 806 periodically announce their presence to all the UEs in their proximity using the announce message.

According to an embodiment herein, in addition to transmitting the announce message, the target UE 806 also starts transmitting a reference signal for link quality measurement. The reference signal can be a synchronization signal or any other reference signal (e.g. D2D SS or SRS or new RS, DM RS etc.). The UE-UE relay may identify the reference signal specific to target UE 806 based on sequence identifier and/or time/frequency resource information related to the reference signal. The information (sequence identifier and/or time/frequency resource information) related to reference signal is transmitted in announce message or UE-UE relay may identify the information related to reference signal using the target UE ID. In one embodiment the information (sequence identifier and/or time/frequency resource information) related to reference signal may be transmitted in separate message (other than announce message). The target UE 806 determines the reference signal related information as follows:

a. The target UE 806 monitors the radio channel for a specific time period to detect the measurement reference signal transmitted by other UEs in its vicinity. Target UE 806 will select a sequence from a set of sequences excluding the detected sequences. Target UE 806 transmit this sequence in measurement reference signal. The time/frequency resource information is fixed/configured by network and known to all UEs. The selected sequence is used as long as it wants or for a specific time period configured by network in broadcast or dedicated signaling or for the time duration it is performing D2D communication.

b. The target UE 806 randomly selects the sequence and/or time resource and/or frequency resources for transmitting measurement reference signal. The selected sequence and/or time/frequency resource is used as long as it wants or for a specific time period configured by network in broadcast or dedicated signaling or for the time duration it is performing D2D communication.

c. The target UE 806 requests the measurement reference signal information from BS. BS assigns a unique sequence and/or time/frequency resource for transmission. The selected sequence is used as long as it wants or for a specific time period configured by network in broadcast or dedicated signaling or for the time duration it is performing D2D communication or until the time it is in connected state.

d. In another embodiment, a base sequence is fixed/configured by network to UEs. UEs derive the sequence for transmitting measurement reference signal using its UE ID. The UE may also derive the time/frequency resource from a set of resources for transmitting measurement reference signal using its UE ID.

e. In another embodiment instead of reference signal transmission, target UE 806 transmits the announce message at short intervals for a defined time so that announce message itself can be used for link measurement. In case the announce message is a discovery message, separate discovery resource pool with shorter discovery period can be configured for transmission of announce message.

According to an embodiment herein, the Source UE (i.e. UE1) transmits a message (i.e. MSG 1) wherein the message indicates that source UE is searching for a UE-UE relay which is in proximity of target UE (i.e. UE 2) 806. MSG 1 is broadcasted by source UE. Alternately it may be group casted to a relay group wherein relay group is a group of UE-UE relays. Alternately it may be group casted to a group to which the source UE and/or target UE 806 belongs. MSG 1 includes one or more of the following: Source UE ID (i.e. UE 1 ID), target UE ID (i.e. UE 2 ID), indicator indicating that UE is searching for UE-UE relay. MSG1 may also include additional information like IP version which the relay should be supporting, QoS requirement of data communication which the source UE intends to perform using the relay, security protocol supported, etc.

In one embodiment, in addition to transmitting the MSG 1, the source UE also starts transmitting a reference signal for link quality measurement by UE-UE relay. The reference signal can be a synchronization signal or any other reference signal (e.g. D2D SS or SRS or new RS etc.). The UE-UE relay may identify the reference signal specific to source UE based on sequence identifier and/or time/frequency resource information related to reference signal. The information (sequence identifier and/or time/frequency resource information) related to reference signal is transmitted in MSG 1 or UE-UE relay may identify the information related to reference signal using the source UE ID. In one embodiment the information (sequence identifier and/or time/frequency resource information) related to reference signal may be transmitted in separate message (other than MSG 1). The source UE determines the reference signal related information as follows:

a. In one embodiment Source UE monitors the radio channel for a specific time period to detect the measurement reference signal transmitted by other UEs in its vicinity. Source UE will select a sequence from a set of sequences excluding the detected sequences. Source UE transmit this sequence in measurement reference signal. The time/frequency resource information is fixed/configured by network and known to all UEs. The selected sequence is used as long as it wants or for a specific time period configured by network in broadcast or dedicated signaling or for the time duration it is performing D2D communication.

b. In another embodiment, Source UE randomly selects the sequence and/or time resource and/or frequency resources for transmitting measurement reference signal. The selected sequence and/or time/frequency resource is used as long as it wants or for a specific time period configured by network in broadcast or dedicated signaling or for the time duration it is performing D2D communication.

c. In another embodiment, Source UE requests the measurement reference signal information from BS. BS assigns a unique sequence and/or time/frequency resource for transmission. The selected sequence is used as long as it wants or for a specific time period configured by network in broadcast or dedicated signaling or for the time duration it is performing D2D communication or until the time it is in connected state.

d. In another embodiment, a base sequence is fixed/configured by network to UEs. UEs derive the sequence for transmitting measurement reference signal using its UE ID. The UE may also derive the time/frequency resource from a set of resources for transmitting measurement reference signal using its UE ID.

In another embodiment, Source UE transmits the MSG 1 at short intervals for a defined time so that MSG 1 itself can be used for link measurement by UE-UE relay. In case the MSG 1 is a discovery message, separate discovery resource pool with shorter discovery period can be configured for transmission of MSG 1.

The UE-UE relay for which the MSG1 is intended and is willing to relay data communication for Source UE (i.e. UE1) checks whether the target UE (i.e. UE2) 806 is in its proximity or not. Target UE 806 is in proximity if it has received the announce message transmitted by it. Note that relay may not be willing to relay if it is overloaded or it cannot support QoS requested by source UE or it does not support IP version requested by source UE or it does not support security protocol supported by source UE. If target UE 806 is in proximity, UE-UE relay measures the source UE-Relay link quality using measurement reference signal transmitted by source UE or MSG 1 transmitted by Source UE. UE-UE relay determines the measurement RS transmitted by source UE based on measurement RS information received in MSG 1/other message or using the source UE ID.UE-UE relay performs multiple measurements over a defined period and averages the measurements done over this defined period. UE-UE relay may also measures the target UE-Relay link quality using measurement reference signal transmitted by target UE 806 or announce message transmitted by target UE 806. UE-UE relay determines the measurement RS transmitted by target UE 806 based on measurement RS information received in announce message/other message or using the target UE ID.UE-UE relay performs multiple measurements over a defined period and averages the measurements done over this defined period.

The target UE 806 can include the power budget in addition to link quality in the above embodiments. For example the power budget can be represented in quantized percentage level of the available battery power, for e.g. 100%, 75%, 50%, 25% etc.

According to an embodiment herein, the UE-UE relay transmits MSG 4 to source UE indicating that it is in proximity of target UE 806 and is willing to relay data communication for Source UE to target UE 806. In alternate embodiment, the relay transmits MSG 4 to source UE indicating that it is in proximity of target UE 806 and is willing to relay data communication for Source UE to target UE 806 if target UE-Relay link quality is greater than a threshold. In alternate embodiment, the relay transmits MSG 4 to source UE indicating that it is in proximity of target UE 806 and is willing to relay data communication for Source UE to target UE 806 if target UE-Relay link quality is greater than a threshold 1 and source UE-Relay link quality is greater than threshold 2. Threshold 1 and threshold 2 may be same. Threshold values may be pre-configured or configured by network. MSG 4 or new message includes the link quality information (RSSI or RSRP or RSRQ) of Target UE-Relay link and/or Source UE-Relay Link. Source UE will receive MSG 4 from multiple relays & Source UE down selects relay using the link quality of Target UE-Relay link and/or Source UE-Relay link received from each UE-UE relay.

The target UE-Relay link quality and Source UE-Relay link quality received from each UE-UE relay is described as follows. The Source UE considers those relay for which Target UE-Relay link quality >=threshold 1 and Source UE-Relay link quality >=threshold 2. In one embodiment threshold 1 and threshold 2 can be same. Threshold 1 and threshold 2 may be pre-configured or configured by network. If there are multiple relays for which Target UE-Relay link quality >=threshold 1 and Source UE-Relay link quality >=threshold 2 then source UE down selects as follows:

a. Source UE selects the relay with best Target UE-Relay link quality b. Source UE selects the relay with best Source UE-Relay link quality c. Source UE selects the relay with best Q=W1*(Target UE-Relay link quality)+W2*(Source UE-Relay link quality) wherein the threshold can be configured by the network or can be pre-specified or can be implementation specific.

d. Source UE selects the relay with the best Q=W1*((1−P1)/(P1+P2))*(Target UE-Relay link quality)+W2*((1−P2)/(P1+P2))*(Source UE-Relay link quality) wherein W1 and W2 are either configured by the network or are pre-specified and P1 is the power budget of the target UE 806 and P2 is the power budget of the source UE.

In another embodiment, Source UE selects the relay with best Q=W1*(Target UE-Relay link quality)+W2*(Source UE-Relay link quality) W1 can be equal to 1−W2.

The target UE-Relay link quality received from each UE-UE relay: Source UE selects the relay with best Target UE-Relay link quality.

The source UE-Relay link quality received from each UE-UE relay: Source UE selects the relay with best Source UE-Relay link quality.

The methods of relay down selection using Target UE-Relay link quality and/or Source UE-Relay link quality can be used in other signaling flows for UE-UE relay based D2D communication and as and when needed by source UE.

Figure 9A:
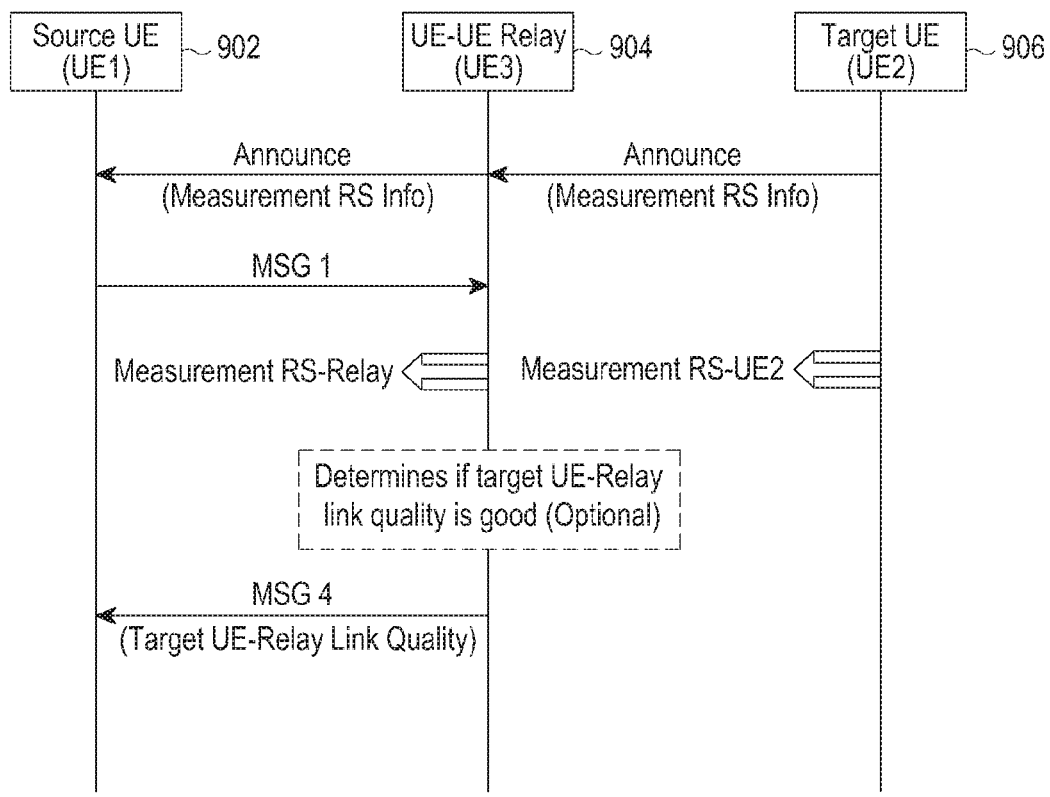
FIG. 9a is a flow diagram illustrating the signaling flow for UE-UE relay selection, according to an embodiment of the present disclosure.

FIG. 9a is a flow diagram illustrating the signaling flow for UE-UE relay selection, according to an embodiment of the present disclosure. The UE-UE relay 904 and 5h3 target UE 906 periodically announce their presence to all the UEs in their proximity using the announce message.

In one embodiment in addition to transmitting the announce message, the UE-UE relay 904 and the target UE 906 also starts transmitting a reference signal for link quality measurement. The reference signal can be a synchronization signal or any other reference signal (e.g. D2D SS or SRS or new RS etc.). The UE-UE relay may identify the reference signal specific to target UE 906 based on sequence identifier and/or time/frequency resource information related to reference signal. The source UE 902 may identify the reference signal specific to UE-UE relay based on sequence identifier and/or time/frequency resource information related to reference signal. The information (sequence identifier and/or time/frequency resource information) related to reference signal is transmitted in announce message. Alternatively, UE-UE relay may identify the information related to reference signal using the target UE ID and source UE 902 may identify the information related to reference signal using the relay UE ID. In one embodiment the information (sequence identifier and/or time/frequency resource information) related to reference signal may be transmitted in separate message (other than announce message). In one embodiment, the UE-UE relay starts transmitting a reference signal for link quality measurement after receiving MSG 1 or after finding the target UE 906 requested in MSG 1 or after finding the good link quality with target UE 906 requested in MSG 1. The target UE/UE-UE relay determines the reference signal related information as follows.

a. In one embodiment Target UE/Relay monitors the radio channel for a specific time period to detect the measurement reference signal transmitted by other UEs in its vicinity. Target UE/Relay will select a sequence from a set of sequences excluding the detected sequences. Target UE/Relay transmits this sequence in measurement reference signal. The time/frequency resource information is fixed/configured by network and known to all UEs. The selected sequence is used as long as it wants or for a specific time period configured by network in broadcast or dedicated signaling or for the time duration it is performing D2D communication.

b. In another embodiment, Target UE/Relay randomly selects the sequence and/or time resource and/or frequency resources for transmitting measurement reference signal. The selected sequence and/or time/frequency resource is used as long as it wants or for a specific time period configured by network in broadcast or dedicated signaling or for the time duration it is performing D2D communication.

c. In another embodiment, Target UE/Relay requests the measurement reference signal information from BS. BS assigns a unique sequence and/or time/frequency resource for transmission. The selected sequence is used as long as it wants or for a specific time period configured by network in broadcast or dedicated signaling or for the time duration it is performing D2D communication or until the time it is in connected state.

d. In another embodiment, a base sequence is fixed/configured by network to UEs. UEs derive the sequence for transmitting measurement reference signal using its UE ID. The UE may also derive the time/frequency resource from a set of resources for transmitting measurement reference signal using its UE ID.

e. In another embodiment instead of reference signal transmission, the target UE 906 and UE-UE relay transmits the announce message at short intervals for a defined time so that announce message itself can be used for link measurement. In case the announce message is a discovery message, separate discovery resource pool with shorter discovery period can be configured for transmission of announce message.

According to an embodiment herein, the Source UE (i.e. UE1) 902 transmits a message (i.e. MSG 1) wherein the message indicates that source UE 902 is searching for a UE-UE relay which is in proximity of target UE 906 (i.e. UE 2). MSG 1 is broadcasted by source UE 902. Alternately it may be group casted to a relay group wherein relay group is a group of UE-UE relays. Alternately it may be group casted to a group to which the source UE 902 and/or target UE 906 belongs. MSG 1 includes one or more of the following: Source UE ID (i.e. UE 1 ID), target UE ID (i.e. UE 2 ID), indicator indicating that UE is searching for UE-UE relay. MSG1 may also include additional information like IP version which the relay should be supporting, QoS requirement of data communication which the source UE 902 intends to perform using the relay, security protocol supported, etc. Source UE 902 measures the source UE-Relay link quality using measurement reference signal transmitted by UE-UE relay or announce message transmitted by UE-UE relay. Source UE 902 determines the measurement RS transmitted by UE-UE relay based on measurement RS information received in announce message/other message or using the relay UE ID. The source UE 902 performs multiple measurements over a defined period and averages the measurements done over this defined period.

The UE-UE relay for which the MSG1 is intended and is willing to relay data communication for Source UE (i.e. UE1) 902 checks whether the target UE (i.e. UE2) 906 is in its proximity or not. The target UE 906 is in proximity if it has received the announce message transmitted by it. Note that relay may not be willing to relay if it is overloaded or it cannot support QoS requested by source UE 902 or it does not support IP version requested by source UE or it does not support security protocol supported by source UE 902. If target UE 906 is in proximity, the UE-UE relay 904 measures the target UE-Relay link quality using measurement reference signal transmitted by the target UE 906 or announce message transmitted by the target UE 906. UE-UE relay determines the measurement RS transmitted by target UE 906 based on measurement RS information received in announce message/other message or using the target UE ID. UE-UE relay 904 performs multiple measurements over a defined period and averages the measurements done over this defined period.

In one embodiment, the target UE 906 can include the power budget in addition to link quality in the above embodiments. For example the power budget can be represented in quantized percentage level of the available battery power e.g. 100%, 75%, 50%, 25% and the like.

According to an embodiment herein, the UE-UE relay 904 transmits MSG 4 to source UE 902 indicating that it is in proximity of target UE and is willing to relay data communication for Source UE 902 to target UE 906. In alternate embodiment, the relay transmits MSG 4 to source UE 902 indicating that it is in proximity of target UE 906 and is willing to relay data communication from the Source UE 902 to the target UE 906 if target UE-Relay link quality is greater than a threshold. MSG 4 or new message include the link quality information (RSSI or RSRP or RSRQ) of the Target UE-Relay link. The source UE 902 will receive MSG 4 from multiple relays and the Source UE 902 down selects relay using the link quality of the target UE-Relay link received from each UE-UE relay in MSG 4 or new message and source UE-Relay link quality measured by the source UE 902.

In one embodiment, the target UE-Relay link quality received from each UE-UE relay is described as follows. The source UE 902 considers those relay for which Target UE-Relay link quality >=threshold 1 and Source UE-Relay link quality >=threshold 2. In one embodiment threshold 1 and threshold 2 can be same. Threshold 1 and threshold 2 may be pre-configured or configured by network. If there are multiple relays for which Target UE-Relay link quality >=threshold 1 and Source UE-Relay link quality >=threshold 2 then source UE 902 down selects as follows:

a. Source UE 902 selects the relay with best Target UE-Relay link quality b. Source UE 902 selects the relay with best Source UE-Relay link quality c. Source UE 902 selects the relay with best Q=W1*(Target UE-Relay link quality)+W2*(Source UE-Relay link quality) wherein the threshold can be configured by the network or can be pre-specified or can be implementation specific d. Source UE 902 selects the relay with the best Q=W1*((1−P1)/(P1+P2))*(Target UE-Relay link quality)+W2*((1−P2)/(P1+P2))*(Source UE-Relay link quality) wherein W1 and W2 are either configured by the network or are pre-specified and P1 is the power budget of the target UE 906 and P2 is the power budget of the source UE.

In one embodiment, if the Target UE-Relay link quality is not received from each UE-UE relay, then the source UE 902 selects the relay with best Source UE-Relay link quality. The methods of relay down selection using Target UE-Relay link quality and/or Source UE-Relay link quality can be used in other signaling flows for UE-UE relay based D2D communication and as and when needed by source UE 902.

Figure 9B:
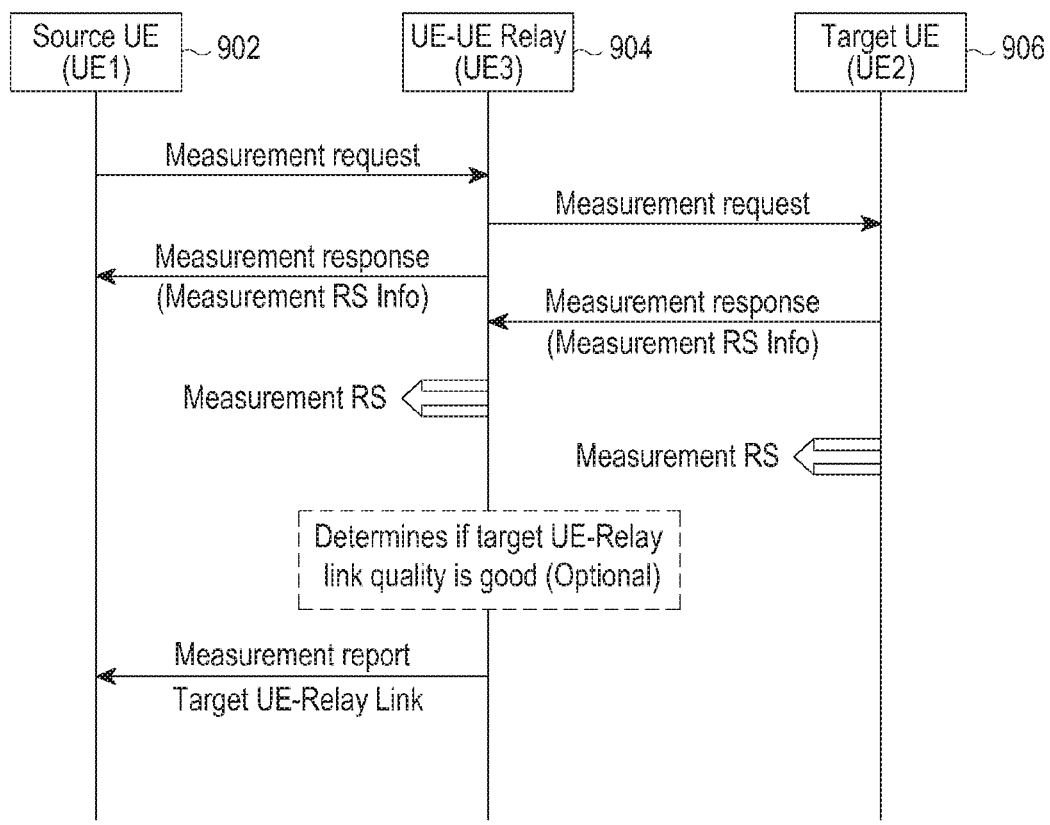
FIG. 9b is a flow diagram illustrating the signaling flow for UE-UE relay selection, according to another embodiment of the present disclosure.

FIG. 9b is a flow diagram illustrating the signaling flow for UE-UE relay selection, according to another embodiment of the present disclosure. The actions performed by Source UE 902, target UE 906 and UE-UE relay 904 with respect to the measurement are same as defined in signaling flow of FIG. 9a.

Meanwhile, an inner structure of a transmitting apparatus in a D2D communication system according to an embodiment of the present disclosure will be described below. In various embodiments of the present disclosure, the transmitting apparatus may be one of a UE, a relay, an eNB, and the like.

A transmitting apparatus includes a transmitter, a controller, a receiver, and a storage unit.

The controller controls the overall operation of the transmitting apparatus. More particularly, the controller controls the transmitting apparatus to perform an operation related to UE-UE relay selection and UE-NW relay selection in a D2D communication system according to an embodiment of the present disclosure. The operation related to the UE-UE relay selection and the UE-NW relay selection in a D2D communication system according to an embodiment of the present disclosure is performed in the manner described with reference to FIGS. 2 to 9b, and a description thereof will be omitted herein.

The transmitter transmits various signals and various messages, and the like to other devices, e.g., a receiving apparatus, and the like included in the D2D communication system under a control of the controller. The various signals, the various messages, and the like transmitted in the transmitter have been described in FIGS. 2 to 9b and a description thereof will be omitted herein.

The receiver receives various signals, various messages, and the like from other devices, e.g., a receiving apparatus, and the like included in the D2D communication system under a control of the controller. The various signals, the various messages, and the like received in the receiver have been described in FIGS. 2 to 9b and a description thereof will be omitted herein.

The storage unit stores a program related to the operation related to the UE-UE relay selection and the UE-NW relay selection in a D2D communication system according to an embodiment of the present disclosure which is performed by the transmitting apparatus under a control of the controller, various data, and the like.

The storage unit stores the various signals and the various messages which are received by the receiver from the other devices, and the like.

While the transmitter, the controller, the receiver, and the storage unit are implemented in the transmitting apparatus as separate units, it is to be understood that this is merely for convenience of description. In other words, two or more of the transmitter, the controller, the receiver, and the storage unit may be incorporated into a single unit. The transmitting apparatus may be implemented with one processor.

Meanwhile, an inner structure of a receiving apparatus in a D2D communication system according to an embodiment of the present disclosure will be described below. In various embodiments of the present disclosure, the receiving apparatus may be one of a UE, a relay, an eNB, and the like.

A receiving apparatus includes a transmitter, a controller, a receiver, and a storage unit.

The controller controls the overall operation of the receiving apparatus. More particularly, the controller controls the receiving apparatus to perform an operation related to UE-UE relay selection and UE-NW relay selection in a D2D communication system according to an embodiment of the present disclosure. The operation related to the UE-UE relay selection and the UE-NW relay selection in a D2D communication system according to an embodiment of the present disclosure is performed in the manner described with reference to FIGS. 2 to 9b, and a description thereof will be omitted herein.

The transmitter transmits various signals and various messages, and the like to other devices, e.g., a transmitting apparatus, and the like included in the D2D communication system under a control of the controller. The various signals, the various messages, and the like transmitted in the transmitter have been described in FIGS. 2 to 9b and a description thereof will be omitted herein.

The receiver receives various signals, various messages, and the like from other devices, e.g., a transmitting apparatus, and the like included in the D2D communication system under a control of the controller. The various signals, the various messages, and the like received in the receiver have been described in FIGS. 2 to 9b and a description thereof will be omitted herein.

The storage unit stores a program related to the operation related to the UE-UE relay selection and the UE-NW relay selection in a D2D communication system according to an embodiment of the present disclosure which is performed by the receiving apparatus under a control of the controller, various data, and the like.

The storage unit stores the various signals and the various messages which are received by the receiver from the other devices, and the like.

While the transmitter, the controller, the receiver, and the storage unit are implemented in the receiving apparatus as separate units, it is to be understood that this is merely for convenience of description. In other words, two or more of the transmitter, the controller, the receiver, and the storage unit may be incorporated into a single unit. The receiving apparatus may be implemented with one processor.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of a user equipment (UE) in a communication system, the method comprising:
   receiving, from relays, relay discovery messages, each relay discovery message including a user information identifier (ID) associated with a relay among the relays and a service code used for identifying a connectivity service;
   identifying that the connectivity service is discovered in case that the service code included in the relay discovery message is same as a service code configured to the UE for a connectivity service authorized to be accessed by the UE, and the user information ID included in the relay discovery message is same as a user information ID configured to the UE for the relay providing the connectivity service;
   measuring radio qualities between the UE and the relays based on a result of the identification; and
   selecting one of the relays as a relay for the UE based on the measured radio qualities,
   wherein each of the radio qualities is a linear average over power contributions of resource elements carrying reference signals.

2. The method of claim 1, wherein selecting the one of the relays as the relay for the UE comprises:
   identifying candidate relays of which linear averages over power contributions of resource elements carrying the reference signals exceed a threshold by a set value among the relays; and
   selecting the relay for the UE among the identified candidate relays based on the measured radio qualities.

3. The method of claim 2,
   wherein the selected relay is a candidate relay of which a linear average is highest among the candidate relays.

4. A method of a relay in a communication system, the method comprising:
   transmitting a relay discovery message including a service code used for identifying a connectivity service and a user information identifier (ID) associated with a relay among relays, and wherein the relay discovery message is associated with reference signals, wherein the connectivity service is discovered in a user equipment (UE), in case that the service code included in the relay discovery message is same as a service code configured to the UE for a connectivity service authorized to be accessed by the UE, and the user information ID included in the relay discovery message is same as a user information ID configured to the UE for the relay providing connectivity service, wherein a radio quality between the UE and the relay is measured based on the reference signals, wherein the measured radio quality is used in selection of a relay for the UE, and wherein the radio quality is a linear average over power contributions of resource elements carrying the reference signals.

5. The method of claim 4, wherein relays of which linear averages over power contributions of resource elements carrying the reference signals exceed a threshold by a set value among the relays are identified as candidate relays, and the relay is selected for the UE among the identified candidate relays based on respective measured radio qualities.

6. The method of claim 5, wherein the selected relay is a candidate relay of which a linear average is highest among the candidate relays.

7. A user equipment (UE) in a communication system, the UE comprising:
at least one processor configured to:
receive, from relays, relay discovery messages, each relay discovery message including a user information identifier (ID) associated with a relay among the relays and a service code used for identifying a connectivity service,
identify that the connectivity service is discovered in case that the service code included in the relay discovery message is same as a service code configured to the UE for a connectivity service authorized to be accessed by the UE, and the user information ID included in the relay discovery message is same as a user information ID configured to the UE for the relay providing the connectivity service,
measure radio qualities between the UE and relays based on a result of the identification, and
select one of the relays as a relay for the UE based on the measured radio qualities, wherein each of the radio qualities is a linear average over power contributions of resource elements carrying reference signals.

8. The UE of claim 7, wherein the at least one processor is configured to:
identify candidate relays of which linear averages over power contributions of resource elements carrying the reference signals exceed a threshold by a set value among the relays, and
select the relay for the UE among the identified candidate relays based on the measured radio qualities.

9. The UE of claim 8,
wherein the selected relay is a candidate relay of which a linear average is the highest among the candidate relays.

10. A relay in a communication system, the relay comprising:
at least one processor configured to transmit a relay discovery message including a service code used for identifying a connectivity service and a user information identifier (ID) associated with a relay among relays, and wherein the relay discovery message is associated with reference signals, wherein the connectivity service is discovered in a user equipment (UE), in case that the service code included in the relay discovery message is same as a service code configured to the UE for a connectivity service authorized to be accessed by the UE, and the user information ID included in the relay discovery message is same as a user information ID configured to the UE for the relay providing the connectivity service, wherein a radio quality between the UE and the relay is to be measured based on the reference signals, wherein the measured radio quality is to be used in selection of a relay for the UE, and wherein the radio quality is a linear average over power contributions of resource elements carrying the reference signals.

11. The relay of claim 10, wherein relays of which linear averages over power contributions of resource elements carrying the reference signals exceed a threshold by a set value among the relays are identified as candidate relays, and the relay is selected for the UE among the identified candidate relays based on the measured radio qualities.

12. The relay of claim 11, wherein the selected relay is a candidate relay of which a linear average is highest among the candidate relays.

* * * * *